US011324030B2

(12) United States Patent
Ly et al.

(10) Patent No.: US 11,324,030 B2
(45) Date of Patent: May 3, 2022

(54) SYSTEM INFORMATION BLOCK DELIVERY FOR NARROWBAND USER EQUIPMENT

(71) Applicant: QUALCOMM Incorporated, San Diego, CA (US)

(72) Inventors: Hung Dinh Ly, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 50 days.

(21) Appl. No.: 16/541,012

(22) Filed: Aug. 14, 2019

(65) Prior Publication Data
US 2020/0059952 A1 Feb. 20, 2020

Related U.S. Application Data

(60) Provisional application No. 62/719,635, filed on Aug. 18, 2018.

(51) Int. Cl.
*H04W 72/12* (2009.01)
*H04W 72/04* (2009.01)
*H04W 72/08* (2009.01)
*H04W 72/00* (2009.01)
*H04L 67/12* (2022.01)

(52) U.S. Cl.
CPC ..... *H04W 72/1289* (2013.01); *H04W 72/005* (2013.01); *H04W 72/042* (2013.01); *H04W 72/085* (2013.01); *H04L 67/12* (2013.01)

(58) Field of Classification Search
CPC ........... H04W 72/1289; H04W 72/005; H04W 72/042; H04W 72/085

USPC ......................................................... 370/329
See application file for complete search history.

(56) References Cited

U.S. PATENT DOCUMENTS

| 10,764,879 B2* | 9/2020 | Bendlin | H04W 72/042 |
| 2013/0196603 A1* | 8/2013 | Gheorghiu | H04L 5/0048 |
| | | | 455/67.11 |
| 2014/0133331 A1* | 5/2014 | Fu | H04W 48/16 |
| | | | 370/252 |

(Continued)

OTHER PUBLICATIONS

International Search Report and Written Opinion—PCT/US2019/046616—ISA/EPO—dated Jan. 17, 2020.

(Continued)

*Primary Examiner* — Faisal Choudhury
(74) *Attorney, Agent, or Firm* — Holland & Hart LLP

(57) ABSTRACT

Methods, systems, and devices for wireless communications are described. The method includes operating in narrowband communications, receiving a message in a physical broadcast channel via the narrowband communications, identifying a message type of the message in the received physical broadcast channel, decoding a master information block in the physical broadcast channel based on the identified message type, and identifying a search space for a physical downlink control channel for receiving a system information block based on the decoded master information block. In some cases, the method includes coexisting with an additional device operating in wideband communications and identifying an indication in the decoded master information block that indicates an additional master information block is to be transmitted.

30 Claims, 18 Drawing Sheets

(56) References Cited

U.S. PATENT DOCUMENTS

| | | | |
|---|---|---|---|
| 2014/0135014 A1* | 5/2014 | Li | H04W 36/0072 |
| | | | 455/436 |
| 2016/0309282 A1 | 10/2016 | Xu et al. | |
| 2017/0064685 A1 | 3/2017 | Rico et al. | |
| 2017/0196019 A1 | 7/2017 | Kim et al. | |
| 2018/0262975 A1* | 9/2018 | Martinez Tarradell | ................ |
| | | | H04W 16/10 |
| 2019/0190686 A1* | 6/2019 | Ye | H04L 27/2666 |
| 2019/0254030 A1* | 8/2019 | Wu | H04W 72/0453 |
| 2020/0252907 A1* | 8/2020 | Rune | H04W 68/02 |
| 2021/0067282 A1* | 3/2021 | Yan | H04L 5/001 |
| 2021/0111824 A1* | 4/2021 | Park | H04J 11/0073 |

OTHER PUBLICATIONS

Lenovo et al., "Views on TDD Downlink Aspect", 3GPP TSG RAN WG1 Meeting #92, 3GPP Draft; R1-1801813, 3rd Generation Partnership Project (3GPP), Mobile Competence Centre, 650, Route Des Lucioles; F-06921 Sophia-Antipolis Cedex, France, vol. RAN WG1, No. Athens, Greece; Feb. 26, 2018-Mar. 2, 2018, Feb. 16, 2018 (Feb. 16, 2018), 7 Pages, XP051396998, Retrieved from the Internet: URL:http://www.3gpp.org/ftp/tsg%5Fran/WG1%5FRL1/TSGR1%5F92/Docs, [retrieved on Feb. 16, 2018], Section 1.
Samsung: "Narrowband LTE Downlink Design (update of GP-150687)", 3GPP TSG GERAN#67, 3GPP Draft; GP-150844 Samsung Narrowband LTE Downlink Design (Update of GP-150687)_R1, 3rd Generation Partnership Project (3GPP), Mobile Competence Centre, 650, Route Des Lucioles ; F-06921 Sophia-An, vol. TSG GERAN, No. Yinchuan, China; Aug. 10, 2015-Aug. 14, 2015, Aug. 10, 2015 (Aug. 10, 2015), 12 Pages, XP051627483, DOI: 15-17, Retrieved from the Internet: URL:http://www.3gpp.org/ftp/tsg%5Fgeran/TSG%5FGERAN/GERAN%5F67%5FYinchuan/Docs/GP%2D150844%2Ezip [retrieved on Aug. 10, 2015], Sections 2 and 3.
NEC Group: "Maximum Bandwidth Reduction for Low-Cost MTC UE based on LTE", 3GPP TSG RAN WG1 Meeting #68, 3GPP Draft; 3GPP TSG RAN WG1 Meeting #68, R1-120259, 3rd Generation Partnership Project (3GPP), Mobile Competence Centre, 650, Route Des Lucioles, F-06921 Sophia-Antipolis Cedex, France, vol. RAN WG1, No. Dresden, Germany, Feb. 6, 2012-Feb. 10, 2012, Jan. 31, 2012 (Jan. 31, 2012), 6 Pages, XP050562813 [retrieved on Jan. 31, 2012], title section 2.2 Bandwidth sharing.
Partial International Search Report—PCT/US2019/046616—ISA/EPO—dated Oct. 22, 2019.

\* cited by examiner

SYSTEM INFORMATION BLOCK DELIVERY FOR NARROWBAND USER EQUIPMENT

CROSS REFERENCE

The present Application for Patent claims the benefit of U.S. Provisional Patent Application No. 62/719,635 by LY, et al., entitled "SYSTEM INFORMATION BLOCK DELIVERY FOR NARROWBAND USER EQUIPMENT," filed Aug. 18, 2018, assigned to the assignee hereof, and expressly incorporated herein.

BACKGROUND

The following relates generally to wireless communications, and more specifically to system information block delivery for narrowband communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Some wireless communications systems may be configured to operate over a shared radio frequency band. However, in some cases a device operating in a communications channel of a first radio channel bandwidth may be unable to operate with another device that is operating in a communications channel of a second radio channel bandwidth different from the first radio channel bandwidth.

SUMMARY

The described techniques relate to improved methods, systems, devices, and apparatuses that support system information block delivery for narrowband communications. Generally, the described techniques provide for configuring control resource sets of search spaces and monitoring occasions configured for narrowband devices.

A method of wireless communication is described. The method may include operating, at a UE, in narrowband communications, receiving, at the UE, a message in a physical broadcast channel via the narrowband communications, identifying, at the UE, a message type of the message in the received physical broadcast channel, decoding, at the UE, a master information block in the physical broadcast channel based on the identified message type, and identifying, at the UE, a search space for a physical downlink control channel for receiving a system information block based on the decoded master information block.

An apparatus for wireless communication is described. The apparatus may include a processor, memory in electronic communication with the processor, and instructions stored in the memory. The instructions may be executable by the processor to cause the apparatus to operate in narrowband communications, receive a message in a physical broadcast channel via the narrowband communications, identify a message type of the message in the received physical broadcast channel, decode a master information block in the physical broadcast channel based on the identified message type, and identify a search space for a physical downlink control channel for receiving a system information block based on the decoded master information block.

Another apparatus for wireless communication is described. The apparatus may include means for operating in narrowband communications, receiving a message in a physical broadcast channel via the narrowband communications, identifying a message type of the message in the received physical broadcast channel, decoding a master information block in the physical broadcast channel based on the identified message type, and identifying a search space for a physical downlink control channel for receiving a system information block based on the decoded master information block.

A non-transitory computer-readable medium storing code for wireless communication is described. The code may include instructions executable by a processor to operate in narrowband communications, receive a message in a physical broadcast channel via the narrowband communications, identify a message type of the message in the received physical broadcast channel, decode a master information block in the physical broadcast channel based on the identified message type, and identify a search space for a physical downlink control channel for receiving a system information block based on the decoded master information block.

Some examples of the method, apparatuses, and non-transitory computer-readable medium described herein may further include operations, features, means, or instructions for identifying a downlink control information in the physical downlink control channel.

Some examples of the method, apparatuses, and non-transitory computer-readable medium described herein may further include operations, features, means, or instructions for scheduling a physical downlink shared channel based on the downlink control information.

Some examples of the method, apparatuses, and non-transitory computer-readable medium described herein may further include operations, features, means, or instructions for receiving the system information block from the physical downlink shared channel.

In some examples of the method, apparatuses, and non-transitory computer-readable medium described herein, identifying the message type further may include operations, features, means, or instructions for identifying a binary value in the message that indicates the message type, a first binary value indicating the master information block in the physical broadcast channel may be configured for the narrowband communications. In some examples of the method, apparatuses, and non-transitory computer-readable medium described herein, the master information block may differ from a second master information block for an additional device operating in wideband communications.

A method of wireless communication is described. The method may include operating, at a UE, in narrowband communications, the UE coexisting with an additional device operating in wideband communications, receiving, at the UE, a physical broadcast channel including a master information block via the narrowband communications, decoding, at the UE, the master information block in the physical broadcast channel, and identifying, at the UE, an indication in the decoded master information block that indicates an additional master information block is to be transmitted to the UE.

An apparatus for wireless communication is described. The apparatus may include a processor, memory in electronic communication with the processor, and instructions stored in the memory. The instructions may be executable by the processor to cause the apparatus to operate in narrowband communications, the UE coexisting with an additional device operating in wideband communications, receive, at the UE, a physical broadcast channel including a master information block via the narrowband communications, decode, at the UE, the master information block in the physical broadcast channel, and identify, at the UE, an indication in the decoded master information block that indicates an additional master information block is to be transmitted to the UE.

Another apparatus for wireless communication is described. The apparatus may include means for operating in narrowband communications, the UE coexisting with an additional device operating in wideband communications, receiving, at the UE, a physical broadcast channel including a master information block via the narrowband communications, decoding, at the UE, the master information block in the physical broadcast channel, and identifying, at the UE, an indication in the decoded master information block that indicates an additional master information block is to be transmitted to the UE.

A non-transitory computer-readable medium storing code for wireless communication is described. The code may include instructions executable by a processor to operate in narrowband communications, the UE coexisting with an additional device operating in wideband communications, receive, at the UE, a physical broadcast channel including a master information block via the narrowband communications, decode, at the UE, the master information block in the physical broadcast channel, and identify, at the UE, an indication in the decoded master information block that indicates an additional master information block is to be transmitted to the UE.

Some examples of the method, apparatuses, and non-transitory computer-readable medium described herein may further include operations, features, means, or instructions for identifying a configuration of a search space for the narrowband communications in the additional master information block, the search space being a search space for a physical downlink control channel for receiving a system information block in the narrowband communications.

Some examples of the method, apparatuses, and non-transitory computer-readable medium described herein may further include operations, features, means, or instructions for identifying an indication to configure a search space for the narrowband communications from a reserved bit in the master information block, the search space being a search space for a physical downlink control channel for receiving a system information block in the narrowband communications.

Some examples of the method, apparatuses, and non-transitory computer-readable medium described herein may further include operations, features, means, or instructions for using a common search space control resource set and common search space monitoring occasion to configure the search space of the narrowband communications when the reserved bit is a first value.

Some examples of the method, apparatuses, and non-transitory computer-readable medium described herein may further include operations, features, means, or instructions for determining the UE is barred from accessing a cell when the reserved bit is a second value different than the first value.

Some examples of the method, apparatuses, and non-transitory computer-readable medium described herein may further include operations, features, means, or instructions for using a narrowband control resource set to configure the search space of the narrowband communications.

Some examples of the method, apparatuses, and non-transitory computer-readable medium described herein may further include operations, features, means, or instructions for comparing a control resource set bandwidth to a predetermined number of physical resource blocks and identifying an indication to configure a search space for the narrowband communications based on the comparison.

Some examples of the method, apparatuses, and non-transitory computer-readable medium described herein may further include operations, features, means, or instructions for using a common search space control resource set and common search space monitoring occasion to configure the search space of the narrowband communications when the control resource set bandwidth may be smaller than or equal to the predetermined number of physical resource blocks.

Some examples of the method, apparatuses, and non-transitory computer-readable medium described herein may further include operations, features, means, or instructions for using a narrowband control resource set to configure the search space of the narrowband communications when the control resource set bandwidth may be greater than the predetermined number of physical resource blocks.

Some examples of the method, apparatuses, and non-transitory computer-readable medium described herein may further include operations, features, means, or instructions for using a common search space control resource set for a narrowband control resource set and using at least one of time division multiplexing (TDM) and frequency division multiplexing (FDM), or both, for a physical downlink control channel of the narrowband control resource set.

Some examples of the method, apparatuses, and non-transitory computer-readable medium described herein may further include operations, features, means, or instructions for one narrowband control resource set occurring per slot. In some cases, a narrowband control resource set starts in a first downlink symbol of a slot.

Some examples of the method, apparatuses, and non-transitory computer-readable medium described herein may further include operations, features, means, or instructions for deriving a monitoring occasion of the narrowband communications from at least one of a system frame number, or corresponding synchronization signal block timing, or common space monitoring occasion, or a combination thereof. In some cases, the synchronization signal block may include both the synchronization signal and a physical broadcast channel in a single block. Thus, in some cases, the synchronization signal block timing may include a synchronization signal/physical broadcast channel block timing.

A method of wireless communication is described. The method may include identifying, by a base station, a UE operating in narrowband communications, determining, by the base station, whether the UE coexists with an additional device operating in wideband communications, setting, by the base station, a message type of a message in a master information block based on the determining, and transmitting, by the base station, the master information block in a physical broadcast channel via the narrowband communications to the UE.

An apparatus for wireless communication is described. The apparatus may include a processor, memory in electronic communication with the processor, and instructions stored in the memory. The instructions may be executable by the processor to cause the apparatus to identify a UE operating in narrowband communications, determine whether the UE coexists with an additional device operating in wideband communications, set a message type of a message in a master information block based on the determining, and transmit the master information block in a physical broadcast channel via the narrowband communications to the UE.

Another apparatus for wireless communication is described. The apparatus may include means for identifying a UE operating in narrowband communications, determining whether the UE coexists with an additional device operating in wideband communications, setting a message type of a message in a master information block based on the determining, and transmitting the master information block in a physical broadcast channel via the narrowband communications to the UE.

A non-transitory computer-readable medium storing code for wireless communication is described. The code may include instructions executable by a processor to identify a UE operating in narrowband communications, determine whether the UE coexists with an additional device operating in wideband communications, set a message type of a message in a master information block based on the determining, and transmit the master information block in a physical broadcast channel via the narrowband communications to the UE.

Some examples of the method, apparatuses, and non-transitory computer-readable medium described herein may further include operations, features, means, or instructions for setting the message type of a message in the master information block upon determining the UE does not coexist with another device operating in the wideband communications.

Some examples of the method, apparatuses, and non-transitory computer-readable medium described herein may further include operations, features, means, or instructions for including configuration for narrowband communications in the master information block.

Some examples of the method, apparatuses, and non-transitory computer-readable medium described herein may further include operations, features, means, or instructions for setting the message type to a value that indicates to the UE to use the configuration to configure a search space for narrowband communications.

A method of wireless communication is described. The method may include identifying, at a base station, a UE operating in narrowband communications, determining, at the base station, whether the UE coexists with an additional device operating in wideband communications, configuring, at the base station based on the determining, a master information block to indicate an additional master information block is to be transmitted to the UE using the narrowband communications, and transmitting, at the base station, the master information block in a physical broadcast channel via the narrowband communications to the UE.

An apparatus for wireless communication is described. The apparatus may include a processor, memory in electronic communication with the processor, and instructions stored in the memory. The instructions may be executable by the processor to cause the apparatus to identify a UE operating in narrowband communications, determine whether the UE coexists with an additional device operating in wideband communications, configure, at the base station based on the determining, a master information block to indicate an additional master information block is to be transmitted to the UE using the narrowband communications, and transmit the master information block in a physical broadcast channel via the narrowband communications to the UE.

Another apparatus for wireless communication is described. The apparatus may include means for identifying a UE operating in narrowband communications, determining whether the UE coexists with an additional device operating in wideband communications, configuring, at the base station based on the determining, a master information block to indicate an additional master information block is to be transmitted to the UE using the narrowband communications, and transmitting the master information block in a physical broadcast channel via the narrowband communications to the UE.

A non-transitory computer-readable medium storing code for wireless communication is described. The code may include instructions executable by a processor to identify a UE operating in narrowband communications, determine whether the UE coexists with an additional device operating in wideband communications, configure, at the base station based on the determining, a master information block to indicate an additional master information block is to be transmitted to the UE using the narrowband communications, and transmit the master information block in a physical broadcast channel via the narrowband communications to the UE.

Some examples of the method, apparatuses, and non-transitory computer-readable medium described herein may further include operations, features, means, or instructions for transmitting the additional master information block to the UE after determining the UE coexists with the additional device operating in wideband communications.

Some examples of the method, apparatuses, and non-transitory computer-readable medium described herein may further include operations, features, means, or instructions for setting a reserved bit in the master information block to indicate to the UE how to configure a search space for the narrowband communications.

Some examples of the method, apparatuses, and non-transitory computer-readable medium described herein may further include operations, features, means, or instructions for setting the reserved bit to a first value to indicate using a common search space control resource set and common search space monitoring occasion to configure the search space of the narrowband communications.

Some examples of the method, apparatuses, and non-transitory computer-readable medium described herein may further include operations, features, means, or instructions for setting the reserved bit to a second value to indicate using a narrowband control resource set to configure the search space of the narrowband communications.

DETAILED DESCRIPTION

Figure 1:
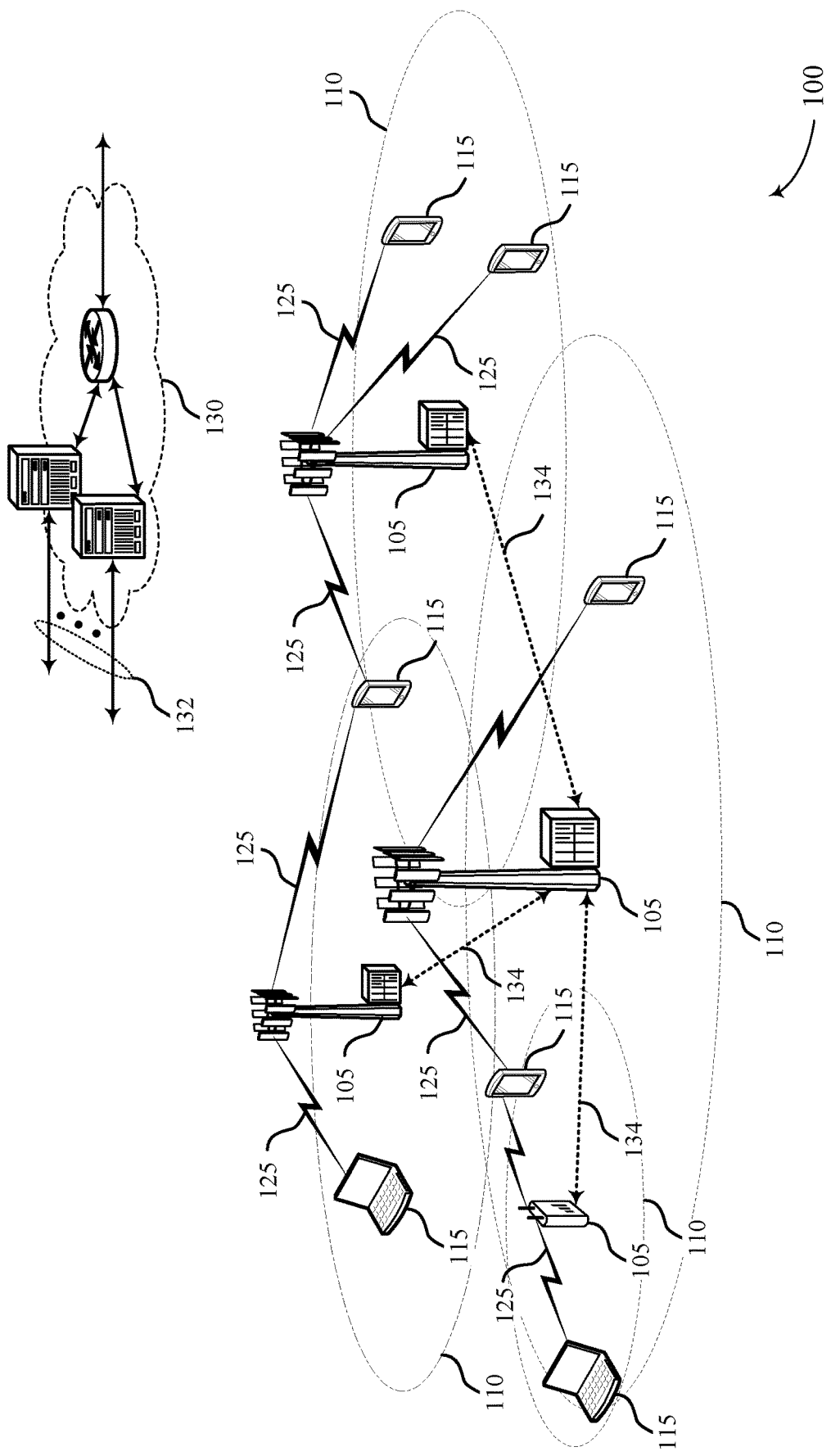
FIG. 1 illustrates an example of a system for wireless communications that supports system information block delivery for narrowband communications in accordance with aspects of the present disclosure.

The following relates to improved techniques for system information block delivery for narrowband communications. Generally, the described techniques provide for configuring control resource sets of search spaces and monitoring occasions configured for narrowband devices.

In one example, a control resource set configured for wideband communications may not be suitable for devices operating in narrowband communications. For example, the bandwidth capabilities of narrowband devices may not be able to handle wideband control resource set configurations with 48 resource blocks or 96 resource blocks, as one example. Accordingly, the present techniques provide how to configure control resource sets of search spaces and monitoring occasions configured for narrowband devices.

In some cases, a narrowband device may include an internet of things (IoT) device, or wearable device, or industrial sensor, or video monitoring equipment, or any combination thereof, operating in a shared radio frequency spectrum band. In some cases, an unlicensed radio frequency spectrum band may be one example of a shared radio frequency spectrum band. In one example, a bandwidth of a narrowband device may be limited to a relatively narrow range of frequencies compared to other devices operating in the shared radio frequency spectrum band. As one example, a narrowband device may have a bandwidth smaller than enhanced mobile broadband (eMBB) devices. Accordingly, in some cases a bandwidth of a control resource set configured for wideband communications may not be suitable for a narrowband device.

In one example, a control resource set may be configured for narrowband devices. In some cases, a narrowband control resource set may be used to configure a search space of a physical downlink control channel that carries a downlink control information (DCI). In some cases, the DCI may be used to schedule a physical downlink shared channel delivering a system information block (e.g., SIB Type1 or SIB1) to narrowband devices or devices operating in narrowband communications.

In some examples, a device may identify a message type in a message received in a physical broadcast channel via narrowband communications. In some cases, the device may decode a master information block from the message based at least in part on the identified message type, and identify a search space for a system information block in a physical downlink control channel based at least in part on the decoded master information block.

In one example, a device may receive via narrowband communications a physical broadcast channel that includes a master information block. In some cases, the device may decode the master information block and identify an indication in the decoded master information block that indicates an additional master information block is to be transmitted to the device.

In some cases, a first device may determine whether a second device operating in narrowband communications coexists with one or more additional device operating in wideband communications. In some cases, the first device may set a message type of a message in a master information block based at least in part on the determining, and transmit the master information block in a physical broadcast channel via the narrowband communications to the second device.

In some cases, a first device may identify a second device operating in narrowband communications and determine whether the second device coexists with one or more other devices operating in wideband communications. In some cases, the first device may configure, based at least in part on the determining, a master information block to indicate an additional master information block is to be transmitted to the second device, and transmit the master information block in a physical broadcast channel via the narrowband communications to the second device.

Aspects of the disclosure are initially described in the context of a wireless communications system. The present techniques include a wireless communications subsystem that enables a narrowband device to coexist in a shared radio frequency band with wideband devices. In some cases, the wireless communications subsystem may include one or more processes to enable the narrowband device to coexist in the shared radio frequency band with wideband devices. Aspects of the disclosure are further illustrated by and described with reference to apparatus diagrams, system diagrams, and flowcharts that relate to system information block delivery for narrowband communications.

FIG. 1 illustrates an example of a wireless communications system 100 that supports system information block delivery for narrowband communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, wearable device, industrial sensor, video monitoring equipment an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In one example, a device (e.g., UE 115 or base station 105) may provide for system information block (e.g., SIB1) delivery for narrowband systems and/or devices. For example, a device (e.g., UE 115 or base station 105) may configure a search space for a physical downlink control channel for receiving a system information block in narrowband communications. Additionally or alternatively, a device (e.g., UE 115 or base station 105) may configure a monitoring occasion for one or more devices operating in narrowband communications.

Figure 2:
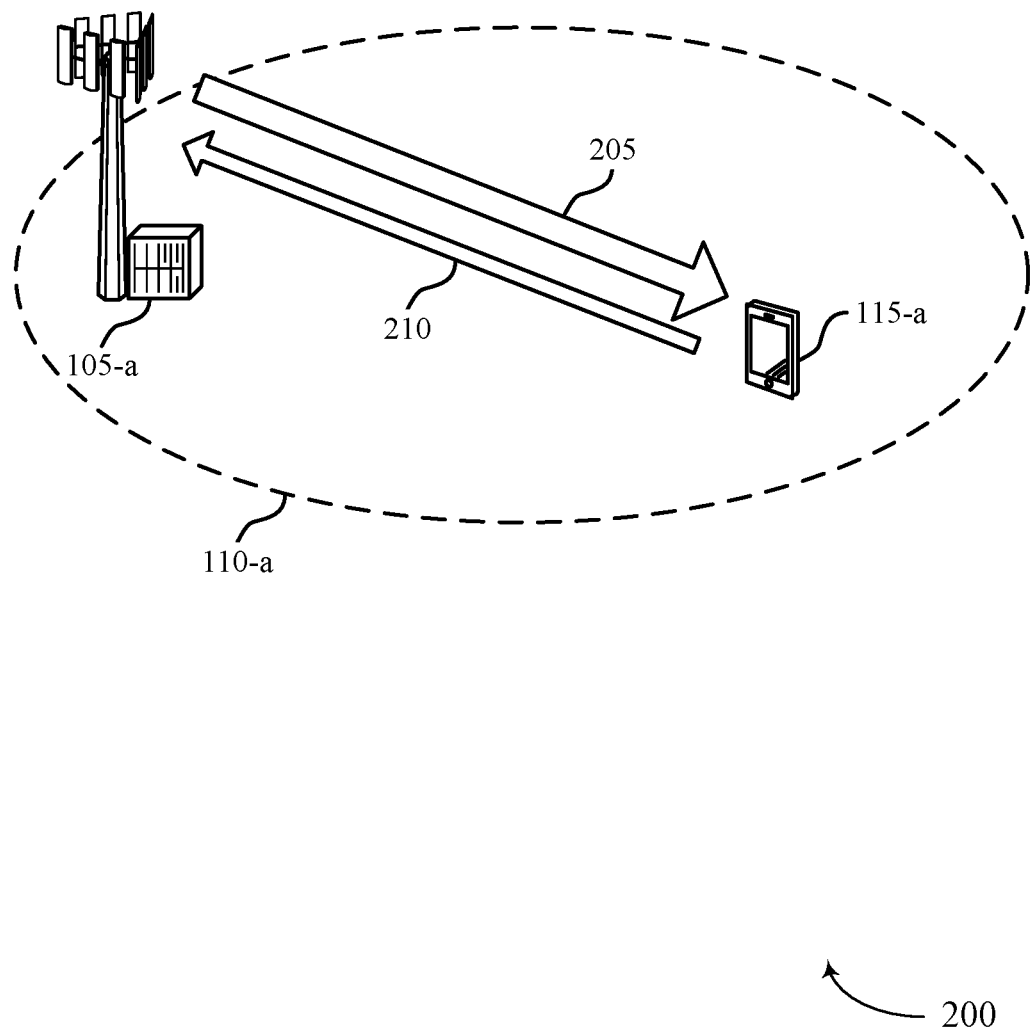
FIG. 2 illustrates an example of a wireless communications subsystem that supports system information block delivery for narrowband communications in accordance with aspects of the present disclosure.

FIG. 2 illustrates an example of a wireless communications subsystem 200 that supports system information block delivery for narrowband communications in accordance with aspects of the present disclosure. In some examples, wireless communications subsystem 200 may implement aspects of wireless communications system 100.

As illustrated, wireless communications subsystem 200 may include UE 115-*a* and base station 105-*a*, which may be examples of a UE 115 or a base station 105, as described above with reference to FIG. 1. Wireless communications subsystem 200 may also include downlink 205 and uplink 210. Base station 105-*a* may use downlink 205 to convey control and/or data information to UE 115-*a*. And UE 115-*a* may use uplink 210 to convey control and/or data information to base station 105-*a*. In some cases, downlink 205 may use different time and/or frequency resources than uplink 210.

In some cases, base station 105-*a* may determine whether UE 115-*a* operates in narrowband communications. In some examples, base station 105-*a* may determine whether UE 115-*a* coexists with one or more additional devices (e.g., additional UEs, etc.) operating in wideband communications upon determining UE 115-*a* operates in narrowband communications. In some cases, base station 105-*a* may set a message type of a message in a master information block based at least in part on determining UE 115-*a* operates in narrowband communications and/or determining whether UE 115-*a* coexists with one or more additional devices operating in wideband communications.

In one example, base station 105-*a* may set the message type of a message in the master information block upon determining the UE does not coexist with another device operating in wideband communications. In some cases, base station 105-*a* may include configuration for narrowband communications in the master information block. In some cases, base station 105-*a* may set the message type to a value that indicates to the UE to use the configuration to configure a search space for narrowband communications. In some cases, base station 105-*a* may transmit to UE 115-*a* the master information block in a physical broadcast channel via the narrowband communications in which UE 115-*a* is operating.

In one example, UE 115-*a* may identify a message type in a message received from base station 105-*a* in a physical broadcast channel via narrowband communications. In some cases, UE 115-*a* may decode a master information block from the message based at least in part on the identified message type. In some examples, UE 115-*a* may identify a search space for a physical downlink control channel for receiving a system information block in narrowband communications based at least in part on the decoded master information block.

In one example, base station 105-*a* may determine UE 115-*a*, operating in narrowband communications, coexists with another device operating in wideband communications. In some cases, base station 105-*a* may configure a first master information block to indicate a second master information block is to be transmitted to UE 115-*a* upon determining UE 115-*a* coexists with at least one other device operating in wideband communications. In some examples, base station 105-*a* may transmit the first master information block in a physical broadcast channel via the narrowband communications to UE 115-*a*.

In some cases, UE 115-*a* may receive via narrowband communications a physical broadcast channel that includes the first master information block. In some cases, UE 115-*a* may decode the first master information block and identify an indication in the decoded first master information block that indicates a second master information block is to be transmitted to UE 115-*a* by base station 105-*a*.

In some cases, UE 115-*a* may receive via narrowband communications a physical broadcast channel that includes the second master information block. In some examples, UE 115-*a* may decode the second master information block to retrieve information encoded in the second master information block regarding configuration of a search space. For example, UE 115-*a* may identify, based on the decoded second master information block, a search space for a physical downlink control channel for receiving a system information block in the narrowband communications.

Figure 3:
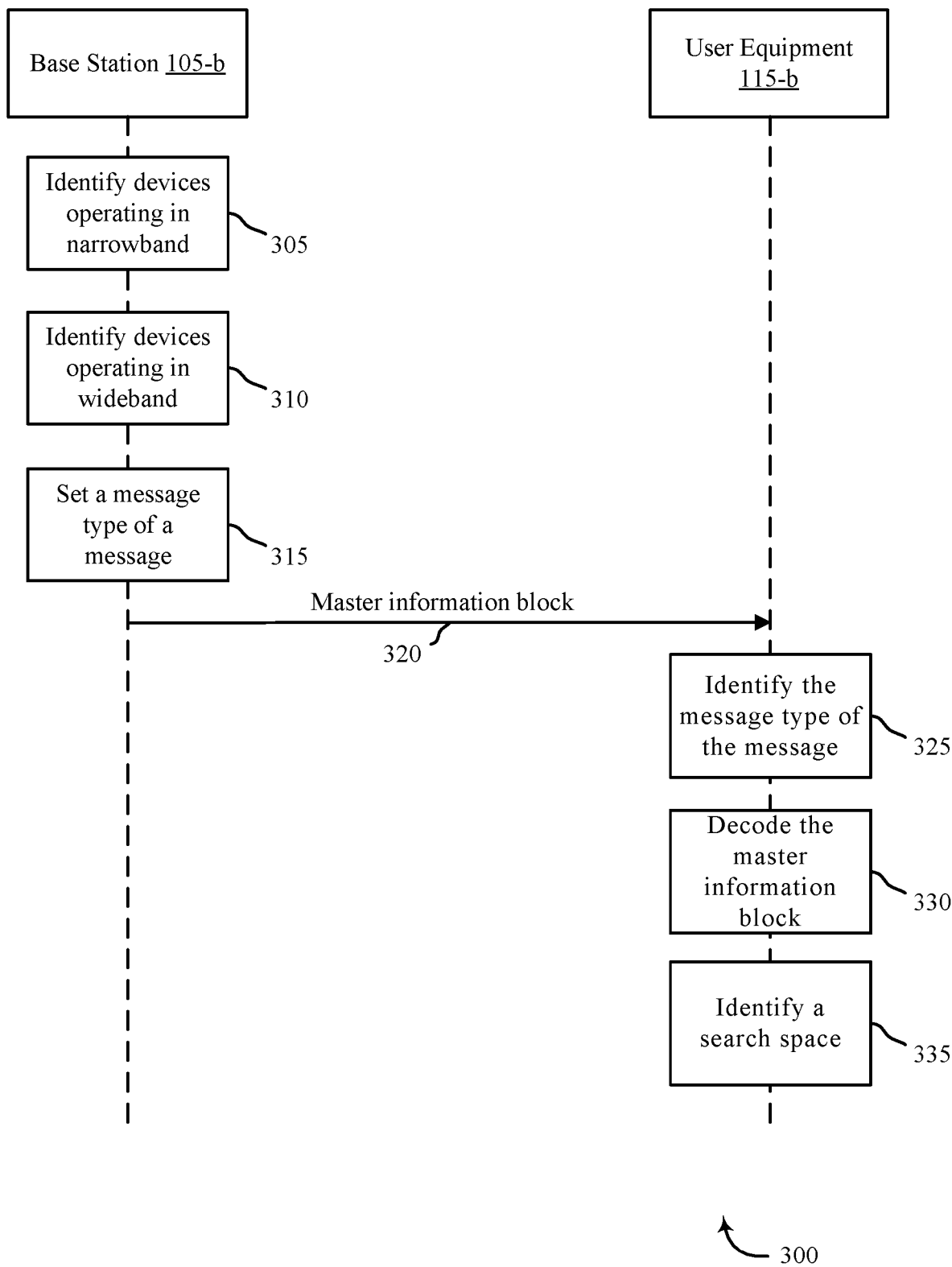
FIGS. 3 and 4 illustrate examples of processes that support system information block delivery for narrowband communications in accordance with aspects of the present disclosure.

FIG. 3 illustrates an example of a process 300 that supports system information block delivery for narrowband communications in accordance with aspects of the present disclosure. In some examples, process 300 may implement aspects of wireless communications system 100. As illustrated, process 300 may include UE 115-*b* and base station 105-*b*, which may be examples of a UE 115 or a base station 105, as described above with reference to FIG. 1.

At block 305, base station 105-*b* may determine whether one or more devices are currently operating in narrowband communications. For example, base station 105-*b* may identify user equipment (UE) 115-*b* operating in narrowband communications.

At block 310, base station 105-*b* may determine whether one or more devices are currently operating in wideband communications. For example, base station 105-*b* may determine whether UE 115-*b* coexists with one or more additional devices operating in wideband communications.

At block 315, base station 105-*b* may set a message type of a message based on the determining of whether one or more devices are currently operating in wideband communications. In one example, base station 105-*b* may set a message type of a message in a master information block upon determining one or more additional devices are currently operating in wideband communications alongside UE 115-*b* operating in narrowband communications.

At 320, base station 105-*b* may transmit the master information block to UE 115-*b*. At 320, UE 115-*b* may receive the master information block from base station 105-*b*. In some cases, base station 105-*b* may transmit the master information block in a physical broadcast channel via the narrowband communications in which UE 115-*b* is operating.

At block 325, UE 115-*b* may identify the message type of the message received from base station 105-*b* in the physical broadcast channel. For example, upon determining that the message includes a message type, UE 115-*b* may analyze the message to determine which message type was set by base station 105-*b* at block 315.

At block 330, UE 115-*b* may decode the master information block in the physical broadcast channel based on the identified message type. At block 335, UE 115-*b* may identify, based on the decoded master information block, a search space for a physical downlink control channel for receiving a system information block in narrowband communications.

Figure 4:
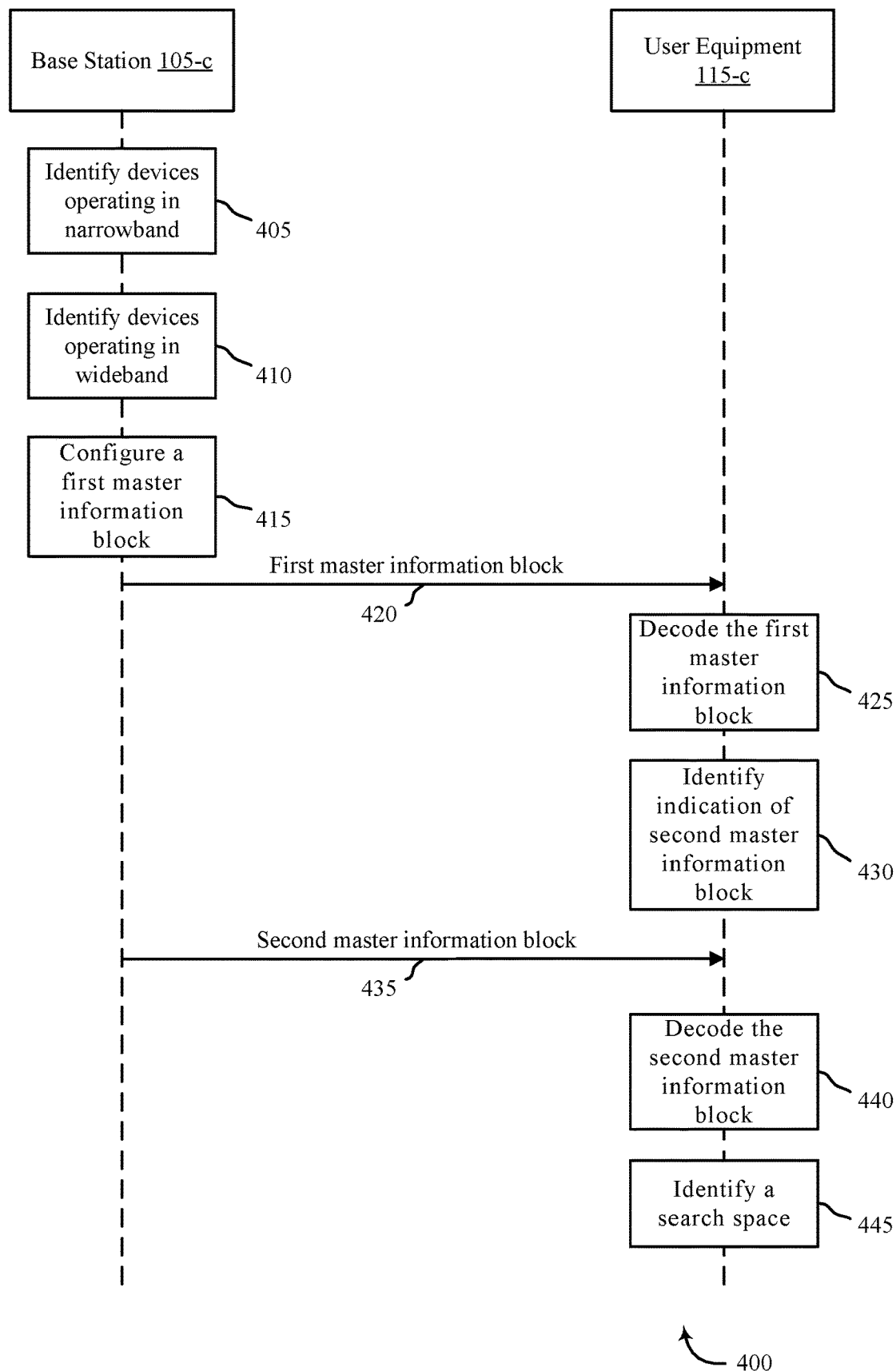

FIG. 4 illustrates an example of a process 400 that supports system information block delivery for narrowband communications in accordance with aspects of the present disclosure. In some examples, process 400 may implement aspects of wireless communications system 100. As illustrated, process 400 may include UE 115-c and base station 105-c, which may be examples of a UE 115 or a base station 105, as described above with reference to FIG. 1.

At block 405, base station 105-c may determine whether one or more devices are currently operating in narrowband communications. For example, base station 105-c may identify at least user equipment (UE) 115-c operating in narrowband communications.

At block 410, base station 105-c may determine whether one or more devices are currently operating in wideband communications. For example, base station 105-c may determine whether UE 115-c coexists with one or more other devices operating in wideband communications.

At block 415, base station 105-c may configure a first master information block based on the determining of whether one or more devices are currently operating in wideband communications alongside UE 115-c. In one example, base station 105-c may configure a first master information block to indicate a second master information block is to be transmitted to UE 115-c upon determining one or more additional devices are currently operating in wideband communications alongside UE 115-c operating in narrowband communications. In one example, base station 105-c may send the first master information block to UE 115-c using the narrowband communications.

At 420, base station 105-c may transmit the first master information block to UE 115-c. At 420, UE 115-c may receive the first master information block from base station 105-c. In one example, base station 105-c may transmit the first master information block in a physical broadcast channel via the narrowband communications in which UE 115-c is operating.

At block 425, UE 115-c may decode the first master information block. For example, upon receiving the first master information block at 420, UE 115-c may decode the first master information block to retrieve information encoded in the first master information block by base station 105-c (e.g., base station 105-c configuring first master information block at block 415).

At block 430, UE 115-c may identify an indication in the decoded first master information block that indicates the base station 105-c is to transmit a second master information block to UE 115-c. In some cases, base station 105-c may configure the second master information block based on the base station 105-c determining UE 115-c coexists with one or more other devices operating in wideband communications. In one example, base station 105-c may configure the second master information block to indicate a configuration of a search space.

At block 435, base station 105-c may transmit the second master information block to UE 115-c. For example, base station 105-c may transmit the second master information block to UE 115-c in a physical broadcast channel via the narrowband communications.

At block 440, UE 115-c may decode the second master information block. For example, upon receiving the second master information block at 435, UE 115-c may decode the second master information block to retrieve information encoded in the second master information block regarding configuration of a search space.

At block 445, UE 115-c may identify, based on the decoded second master information block, a search space for a physical downlink control channel for receiving a system information block in narrowband communications.

Figure 5:
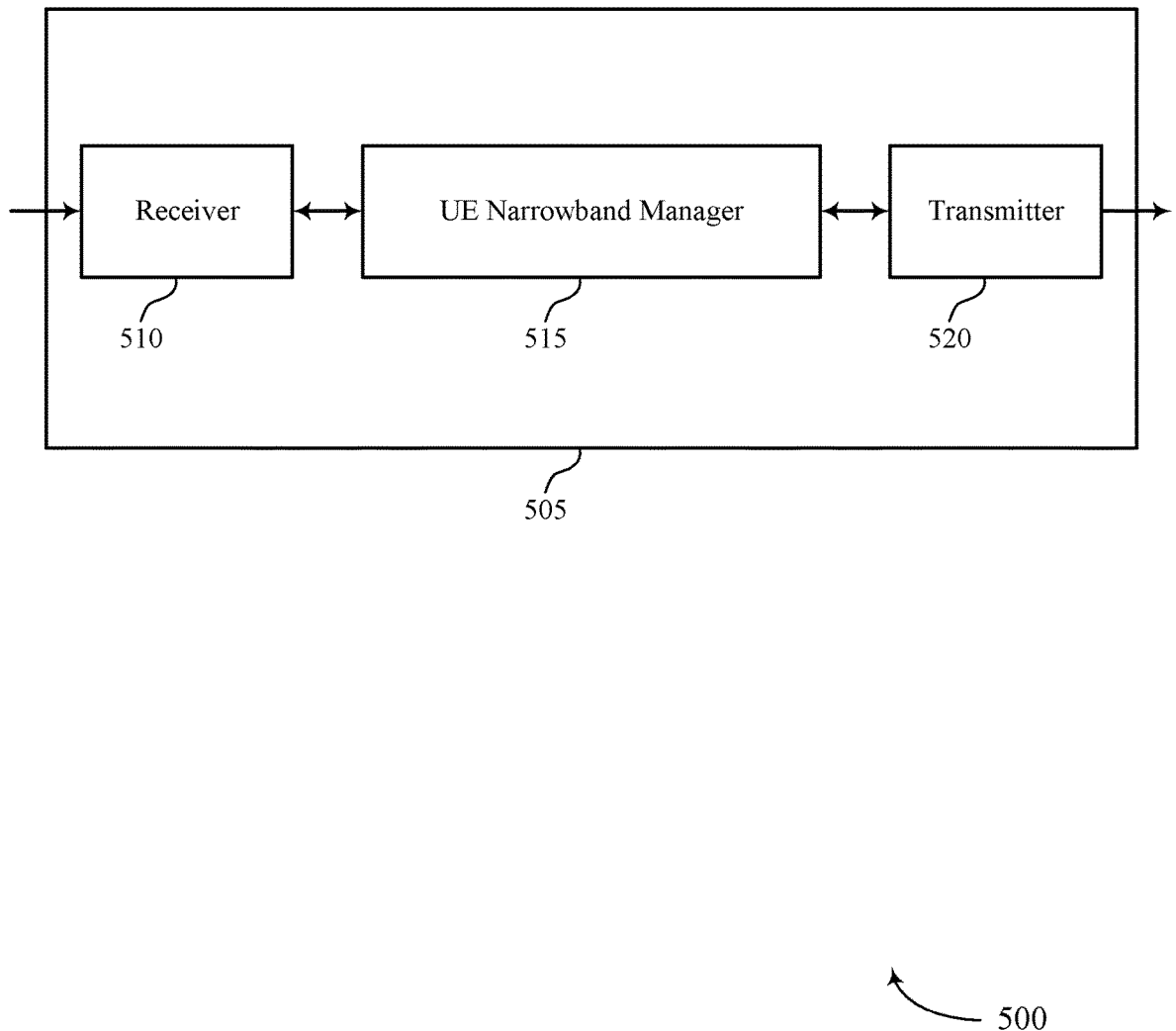
FIGS. 5 and 6 show block diagrams of devices that support system information block delivery for narrowband communications in accordance with aspects of the present disclosure.

FIG. 5 shows a block diagram 500 of a device 505 that supports system information block delivery for narrowband communications in accordance with aspects of the present disclosure. The device 505 may be an example of aspects of a UE 115 as described herein. The device 505 may include a receiver 510, a UE narrowband manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to system information block delivery for narrowband communications, etc.). Information may be passed on to other components of the device 505. The receiver 510 may be an example of aspects of the transceiver 820 described with reference to FIG. 8. The receiver 510 may utilize a single antenna or a set of antennas.

The UE narrowband manager 515 may operate, at a UE, in narrowband communications, receive, at the UE, a message in a physical broadcast channel via the narrowband communications, identify, at the UE, a message type of the message in the received physical broadcast channel, identify, at the UE, a search space for a physical downlink control channel for receiving a system information block based on the decoded master information block, and decode, at the UE, a master information block in the physical broadcast channel based on the identified message type. The UE narrowband manager 515 may also operate, at a UE, in narrowband communications, the UE coexisting with an additional device operating in wideband communications, receive, at the UE, a physical broadcast channel including a master information block via the narrowband communications, decode, at the UE, the master information block in the physical broadcast channel, and identify, at the UE, an indication in the decoded master information block that indicates an additional master information block is to be transmitted to the UE. The UE narrowband manager 515 may be an example of aspects of the UE narrowband manager 810 described herein.

The UE narrowband manager 515, or its sub-components, may be implemented in hardware, code (e.g., software or firmware) executed by a processor, or any combination thereof. If implemented in code executed by a processor, the functions of the UE narrowband manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The UE narrowband manager 515, or its sub-components, may be physically located at various positions, including being distributed such that portions of functions are implemented at different physical locations by one or more physical components. In some examples, the UE narrowband manager 515, or its sub-components, may be a separate and distinct component in accordance with various aspects of the present disclosure. In some examples, the UE narrowband manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
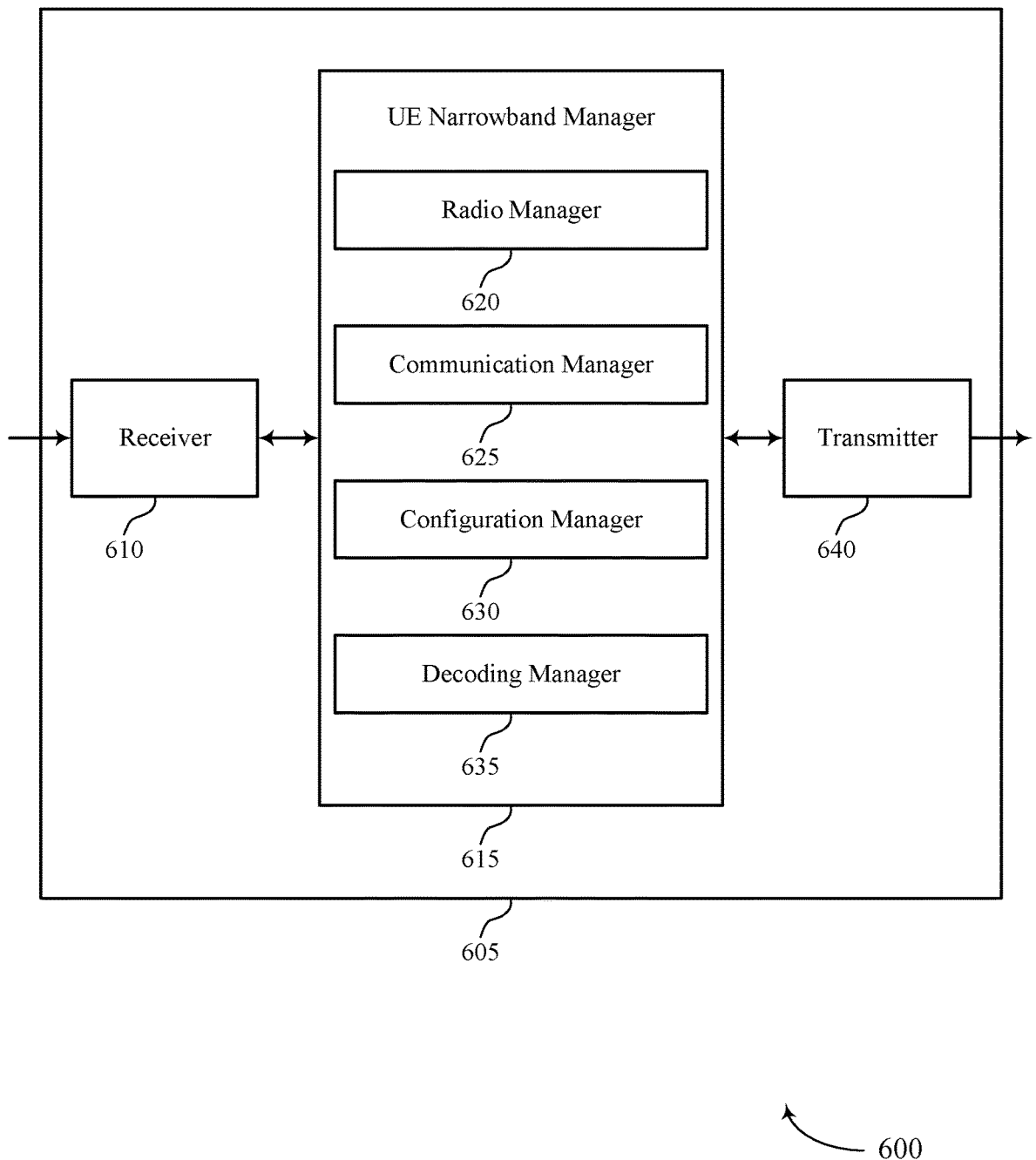

FIG. 6 shows a block diagram 600 of a device 605 that supports system information block delivery for narrowband communications in accordance with aspects of the present disclosure. The device 605 may be an example of aspects of a device 505 or a UE 115 as described herein. The device 605 may include a receiver 610, a UE narrowband manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to system information block delivery for narrowband communications, etc.). Information may be passed on to other components of the device 605. The receiver 610 may be an example of aspects of the transceiver 820 described with reference to FIG. 8. The receiver 610 may utilize a single antenna or a set of antennas.

The UE narrowband manager 615 may be an example of aspects of the UE narrowband manager 515 as described herein. The UE narrowband manager 615 may include a radio manager 620, a communication manager 625, a configuration manager 630, and a decoding manager 635. The UE narrowband manager 615 may be an example of aspects of the UE narrowband manager 810 described herein. The radio manager 620 may operate, at a UE, in narrowband communications. The communication manager 625 may receive, at the UE, a message in a physical broadcast channel via the narrowband communications.

The configuration manager 630 may identify, at the UE, a message type of the message in the received physical broadcast channel and identify, at the UE, a search space for a physical downlink control channel for receiving a system information block based on the decoded master information block.

The decoding manager 635 may decode, at the UE, a master information block in the physical broadcast channel based on the identified message type. The radio manager 620 may operate, at a UE, in narrowband communications, the UE coexisting with an additional device operating in wideband communications. The communication manager 625 may receive, at the UE, a physical broadcast channel including a master information block via the narrowband communications.

The decoding manager 635 may decode, at the UE, the master information block in the physical broadcast channel. The configuration manager 630 may identify, at the UE, an indication in the decoded master information block that indicates an additional master information block is to be transmitted to the UE.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
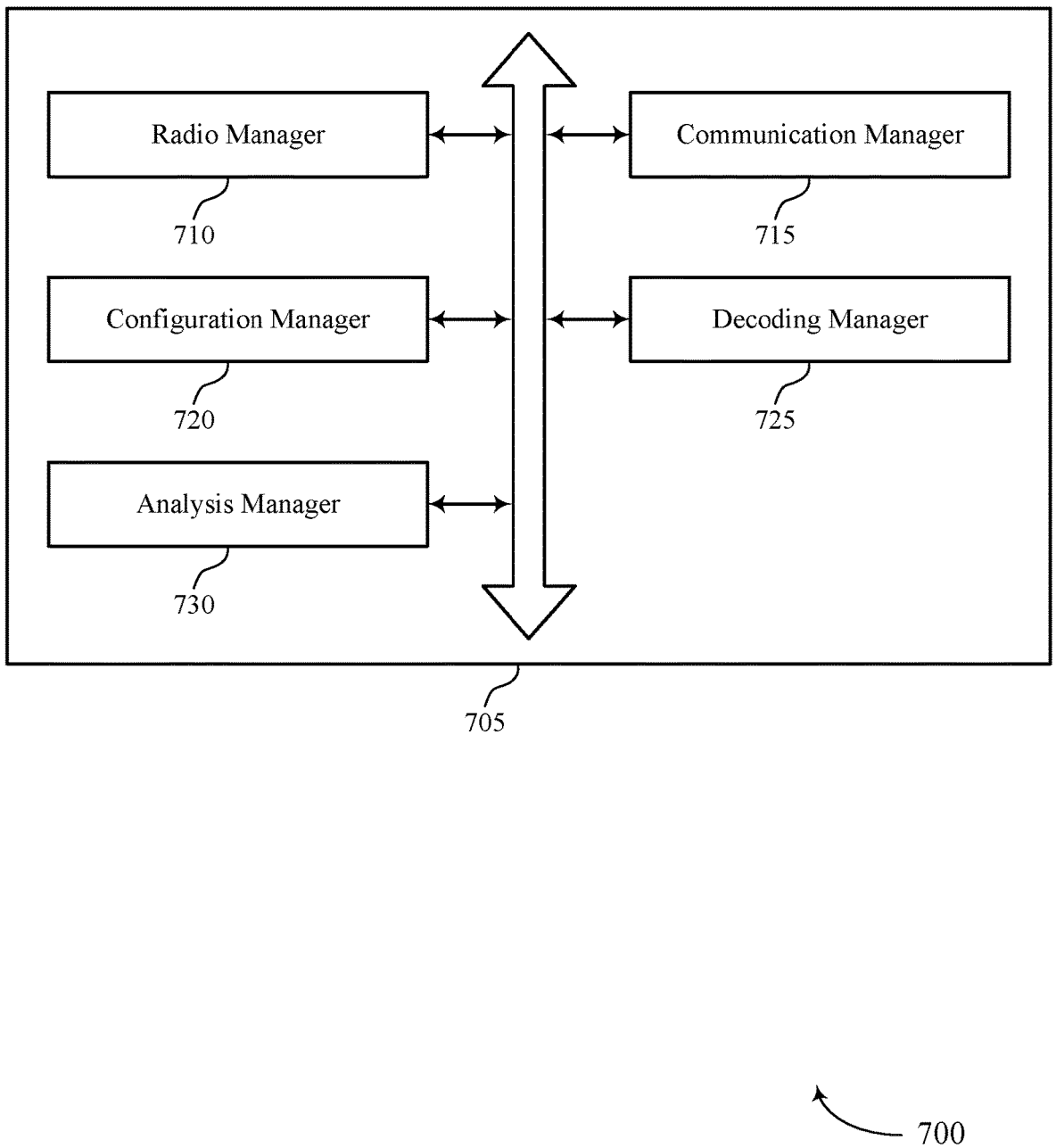
FIG. 7 shows a block diagram of a user equipment (UE) narrowband manager that supports system information block delivery for narrowband communications in accordance with aspects of the present disclosure.

FIG. 7 shows a block diagram 700 of a UE narrowband manager 705 that supports system information block delivery for narrowband communications in accordance with aspects of the present disclosure. The UE narrowband manager 705 may be an example of aspects of a UE narrowband manager 515, a UE narrowband manager 615, or a UE narrowband manager 810 described herein. The UE narrowband manager 705 may include a radio manager 710, a communication manager 715, a configuration manager 720, a decoding manager 725, and an analysis manager 730. Each of these modules may communicate, directly or indirectly, with one another (e.g., via one or more buses).

The radio manager 710 may operate, at a UE, in narrowband communications. In some examples, the radio manager 710 may operate, at a UE, in narrowband communications, the UE coexisting with an additional device operating in wideband communications. The communication manager 715 may receive, at the UE, a message in a physical broadcast channel via the narrowband communications.

In some examples, the communication manager 715 may receive, at the UE, a physical broadcast channel including a master information block via the narrowband communications. In some examples, the communication manager 715 may receive the system information block from the physical downlink shared channel. The configuration manager 720 may identify, at the UE, a message type of the message in the received physical broadcast channel.

In some examples, the configuration manager 720 may identify, at the UE, a search space for a physical downlink control channel for receiving a system information block based on the decoded master information block. In some examples, the configuration manager 720 may identify, at the UE, an indication in the decoded master information block that indicates an additional master information block is to be transmitted to the UE.

In some examples, the configuration manager 720 may identify a downlink control information in the physical downlink control channel. In some examples, the configuration manager 720 may schedule a physical downlink shared channel based on the downlink control information. In some examples, the configuration manager 720 may identify a binary value in the message that indicates the message type. In one example, a first binary value (e.g., binary 0 or binary 1) may indicate the master information block in the physical broadcast channel is configured for the narrowband communications. In another example, a second binary value (e.g., binary 1 or binary 0), different from the first binary value, may indicate the master information block in the physical broadcast channel is configured for wideband communications. In some examples, the master information block may differ from a second master information block for an additional device operating in wideband communications. For example, a first master information block for a narrowband UE may be different (e.g., different information fields). In some cases, a first master information block for a narrowband UE may be interpreted differently from a second master information block for a wideband UE (e.g., same information field, but different interpretation on the value).

In some examples, the configuration manager 720 may identify a configuration of a search space for the narrowband communications in the additional master information block, the search space being a search space for a physical downlink control channel for receiving a system information block in the narrowband communications. In some examples, the configuration manager 720 may identify an indication to configure a search space for the narrowband communications from a reserved bit in the master information block, the search space being a search space for a physical downlink control channel for receiving a system information block in the narrowband communications.

In some examples, the configuration manager 720 may use a common search space control resource set and common search space monitoring occasion to configure the search space of the narrowband communications when the reserved bit is a first value (e.g., binary 0 or binary 1). For example, when the UE is operating in narrowband communications and not coexisting with an additional device operating in wideband communications, the configuration manager 720 may use a common search space control resource set and common search space monitoring occasion to configure the search space of the narrowband communications when the reserved bit is the first value. In some examples, the configuration manager 720 may determine the UE is barred from accessing a cell when the reserved bit is a second value different than or opposite from the first value (e.g., binary 1 or binary 0). For example, when the UE is operating in narrowband communications and not coexisting with an additional device operating in wideband communications, a base station may configure the reserved bit to a second value provided to indicate that the UE is barred from accessing a cell provided by the base station. In one example, "common" may refer to the common search space control resource set and common search space monitoring occasion being in a master information block in the physical broadcast channel used for wideband communications (e.g., for configuring a wideband user equipment).

In some examples, the configuration manager 720 may use a narrowband control resource set to configure the search space of the narrowband communications. In some examples, the configuration manager 720 may identify an indication to configure a search space for the narrowband communications based on the comparison.

In some examples, the configuration manager 720 may use a common search space control resource set and common search space monitoring occasion to configure the search space of the narrowband communications when the control resource set bandwidth is smaller than or equal to the predetermined number of physical resource blocks. In one example, "common" may refer to the common search space control resource set and common search space monitoring occasion being in a master information block in the physical broadcast channel used for wideband communications (e.g., for configuring a wideband user equipment).

In some examples, the configuration manager 720 may use a narrowband control resource set to configure the search space of the narrowband communications when the control resource set bandwidth is greater than the predetermined number of physical resource blocks.

In some examples, the configuration manager 720 may use a common search space control resource set for a narrowband control resource set. In some examples, the configuration manager 720 may use at least one of time division multiplexing (TDM) and frequency division multiplexing (FDM), or both, for a physical downlink control channel of the narrowband control resource set. In some examples, the configuration manager 720 may derive a monitoring occasion of the narrowband communications from at least one of a system frame number, or corresponding synchronization signal block timing, or common space monitoring occasion, or a combination thereof. In some cases, the synchronization signal block may include both the synchronization signal and a physical broadcast channel in a single block. Thus, in some cases, the synchronization signal block timing may include a synchronization signal/physical broadcast channel block timing.

The decoding manager 725 may decode, at the UE, a master information block in the physical broadcast channel based on the identified message type. In some examples, the decoding manager 725 may decode, at the UE, the master information block in the physical broadcast channel. The analysis manager 730 may compare a control resource set bandwidth to a predetermined number of physical resource blocks.

Figure 8:
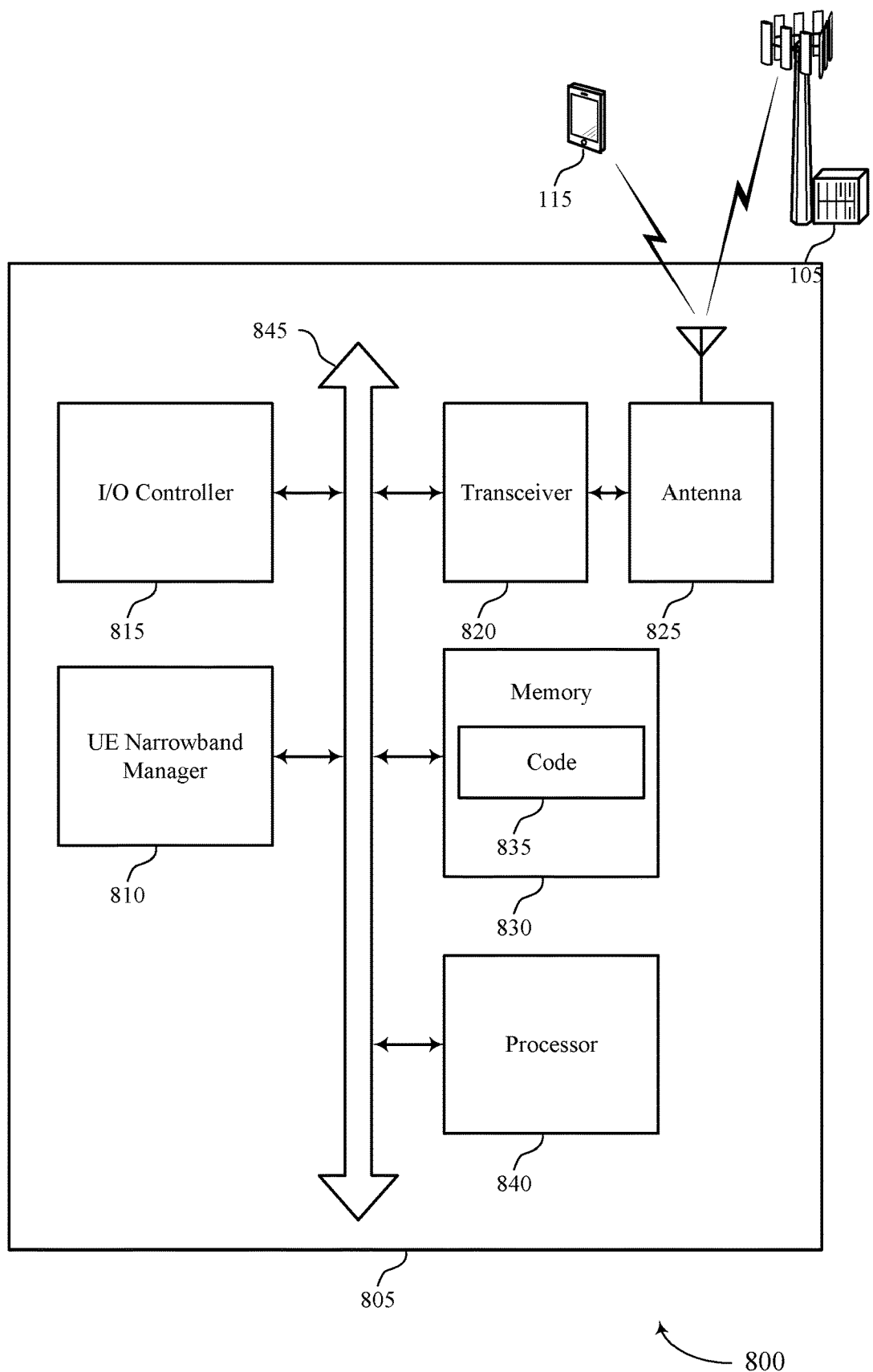
FIG. 8 shows a diagram of a system including a device that supports system information block delivery for narrowband communications in accordance with aspects of the present disclosure.

FIG. 8 shows a diagram of a system 800 including a device 805 that supports system information block delivery for narrowband communications in accordance with aspects of the present disclosure. The device 805 may be an example of or include the components of device 505, device 605, or a UE 115 as described herein. The device 805 may include components for bi-directional voice and data communications including components for transmitting and receiving communications, including a UE narrowband manager 810, an I/O controller 815, a transceiver 820, an antenna 825, memory 830, and a processor 840. These components may be in electronic communication via one or more buses (e.g., bus 845).

The UE narrowband manager 810 may operate, at a UE, in narrowband communications, receive, at the UE, a message in a physical broadcast channel via the narrowband communications, identify, at the UE, a message type of the message in the received physical broadcast channel, identify, at the UE, a search space for a physical downlink control channel for receiving a system information block based on the decoded master information block, and decode, at the UE, a master information block in the physical broadcast channel based on the identified message type. The UE narrowband manager 810 may also operate, at a UE, in narrowband communications, the UE coexisting with an additional device operating in wideband communications, receive, at the UE, a physical broadcast channel including a master information block via the narrowband communications, decode, at the UE, the master information block in the physical broadcast channel, and identify, at the UE, an indication in the decoded master information block that indicates an additional master information block is to be transmitted to the UE.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting system information block delivery for narrowband communications).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
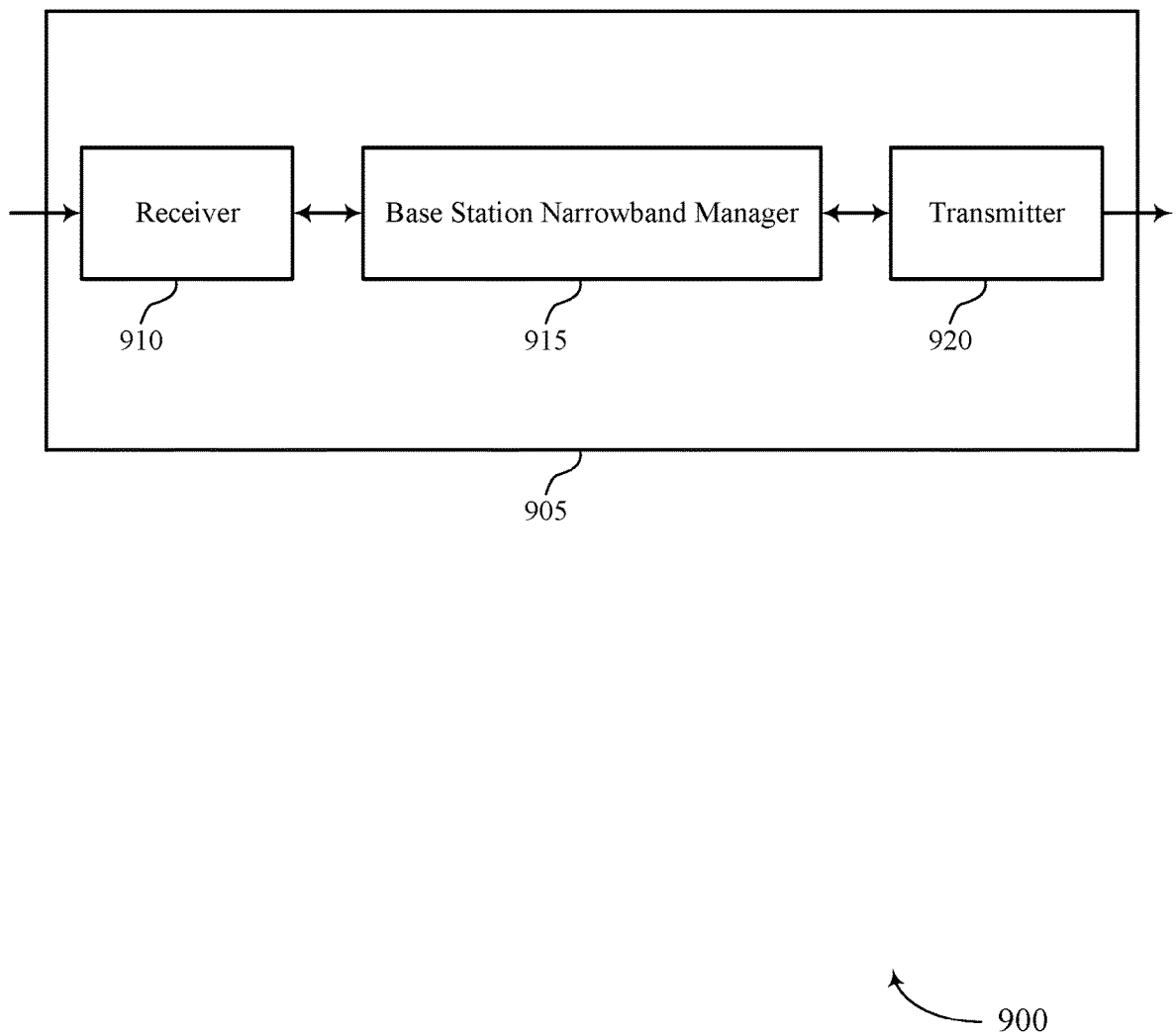
FIGS. 9 and 10 show block diagrams of devices that support system information block delivery for narrowband communications in accordance with aspects of the present disclosure.

FIG. 9 shows a block diagram 900 of a device 905 that supports system information block delivery for narrowband communications in accordance with aspects of the present disclosure. The device 905 may be an example of aspects of a base station 105 as described herein. The device 905 may include a receiver 910, a base station narrowband manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to system information block delivery for narrowband communications, etc.). Information may be passed on to other components of the device 905. The receiver 910 may be an example of aspects of the transceiver 1220 described with reference to FIG. 12. The receiver 910 may utilize a single antenna or a set of antennas.

The base station narrowband manager 915 may identify, by a base station, a UE operating in narrowband communications, determine, by the base station, whether the UE coexists with an additional device operating in wideband communications, set, by the base station, a message type of a message in a master information block based on the determining, and transmit, by the base station, the master information block in a physical broadcast channel via the narrowband communications to the UE. The base station narrowband manager 915 may also identify, at a base station, a UE operating in narrowband communications, determine, at the base station, whether the UE coexists with an additional device operating in wideband communications, configure, at the base station based on the determining, a master information block to indicate an additional master information block is to be transmitted to the UE using the narrowband communications, and transmit, at the base station, the master information block in a physical broadcast channel via the narrowband communications to the UE. The base station narrowband manager 915 may be an example of aspects of the base station narrowband manager 1210 described herein.

The base station narrowband manager 915, or its sub-components, may be implemented in hardware, code (e.g., software or firmware) executed by a processor, or any combination thereof. If implemented in code executed by a processor, the functions of the base station narrowband manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station narrowband manager 915, or its sub-components, may be physically located at various positions, including being distributed such that portions of functions are implemented at different physical locations by one or more physical components. In some examples, the base station narrowband manager 915, or its sub-components, may be a separate and distinct component in accordance with various aspects of the present disclosure. In some examples, the base station narrowband manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
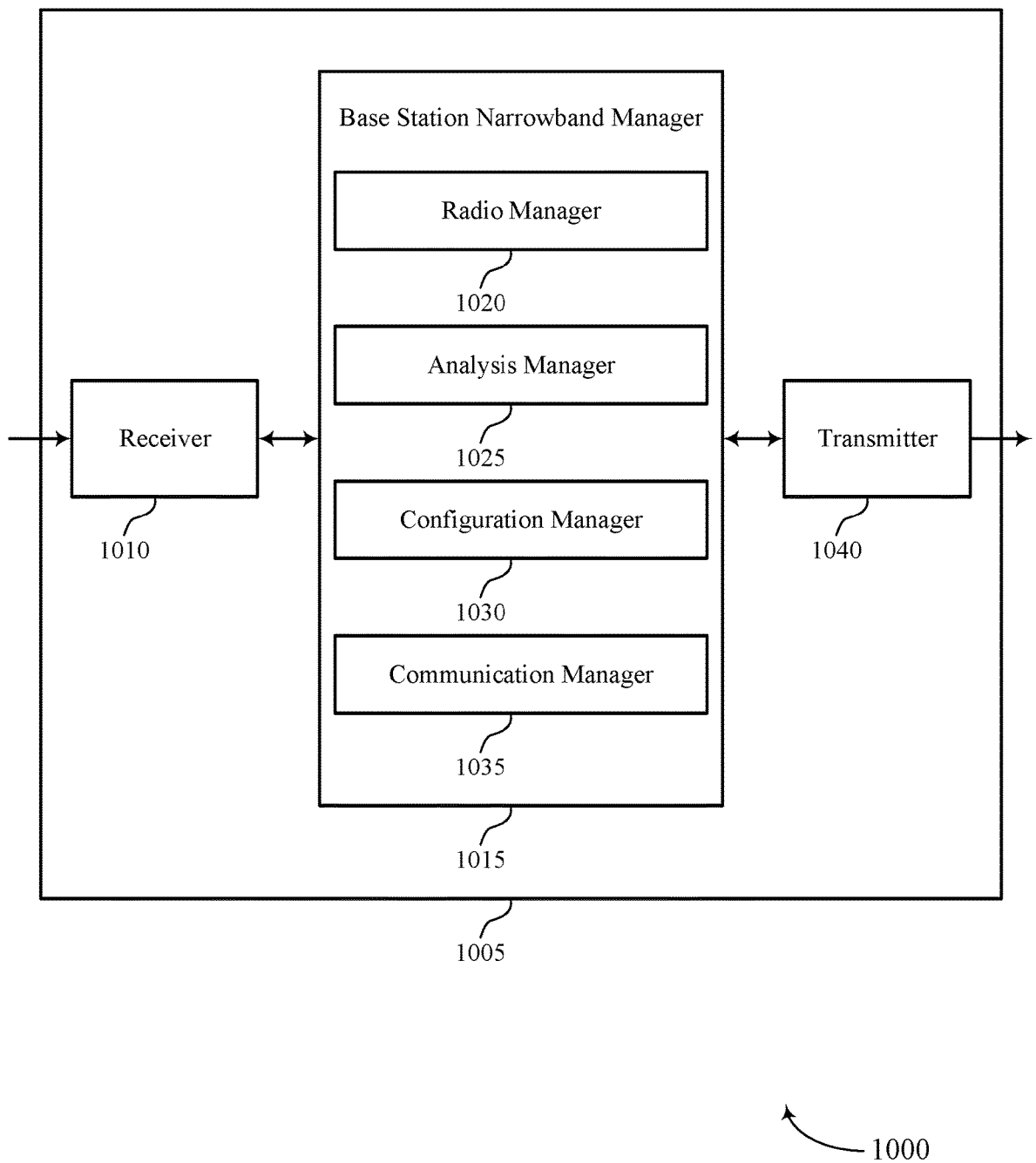

FIG. 10 shows a block diagram 1000 of a device 1005 that supports system information block delivery for narrowband communications in accordance with aspects of the present disclosure. The device 1005 may be an example of aspects of a device 905 or a base station 115 as described herein. The device 1005 may include a receiver 1010, a base station narrowband manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to system information block delivery for narrowband communications, etc.). Information may be passed on to other components of the device 1005. The receiver 1010 may be an example of aspects of the transceiver 1220 described with reference to FIG. 12. The receiver 1010 may utilize a single antenna or a set of antennas.

The base station narrowband manager 1015 may be an example of aspects of the base station narrowband manager 915 as described herein. The base station narrowband manager 1015 may include a radio manager 1020, an analysis manager 1025, a configuration manager 1030, and a communication manager 1035. The base station narrowband manager 1015 may be an example of aspects of the base station narrowband manager 1210 described herein.

The radio manager 1020 may identify, by a base station, a UE operating in narrowband communications. The analysis manager 1025 may determine, by the base station, whether the UE coexists with an additional device operating in wideband communications. The configuration manager 1030 may set, by the base station, a message type of a message in a master information block based on the determining.

The communication manager 1035 may transmit, by the base station, the master information block in a physical broadcast channel via the narrowband communications to the UE. The radio manager 1020 may identify, at a base station, a UE operating in narrowband communications. The analysis manager 1025 may determine, at the base station, whether the UE coexists with an additional device operating in wideband communications.

The configuration manager 1030 may configure, at the base station based on the determining, a master information block to indicate an additional master information block is to be transmitted to the UE using the narrowband communications. The communication manager 1035 may transmit, at the base station, the master information block in a physical broadcast channel via the narrowband communications to the UE.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
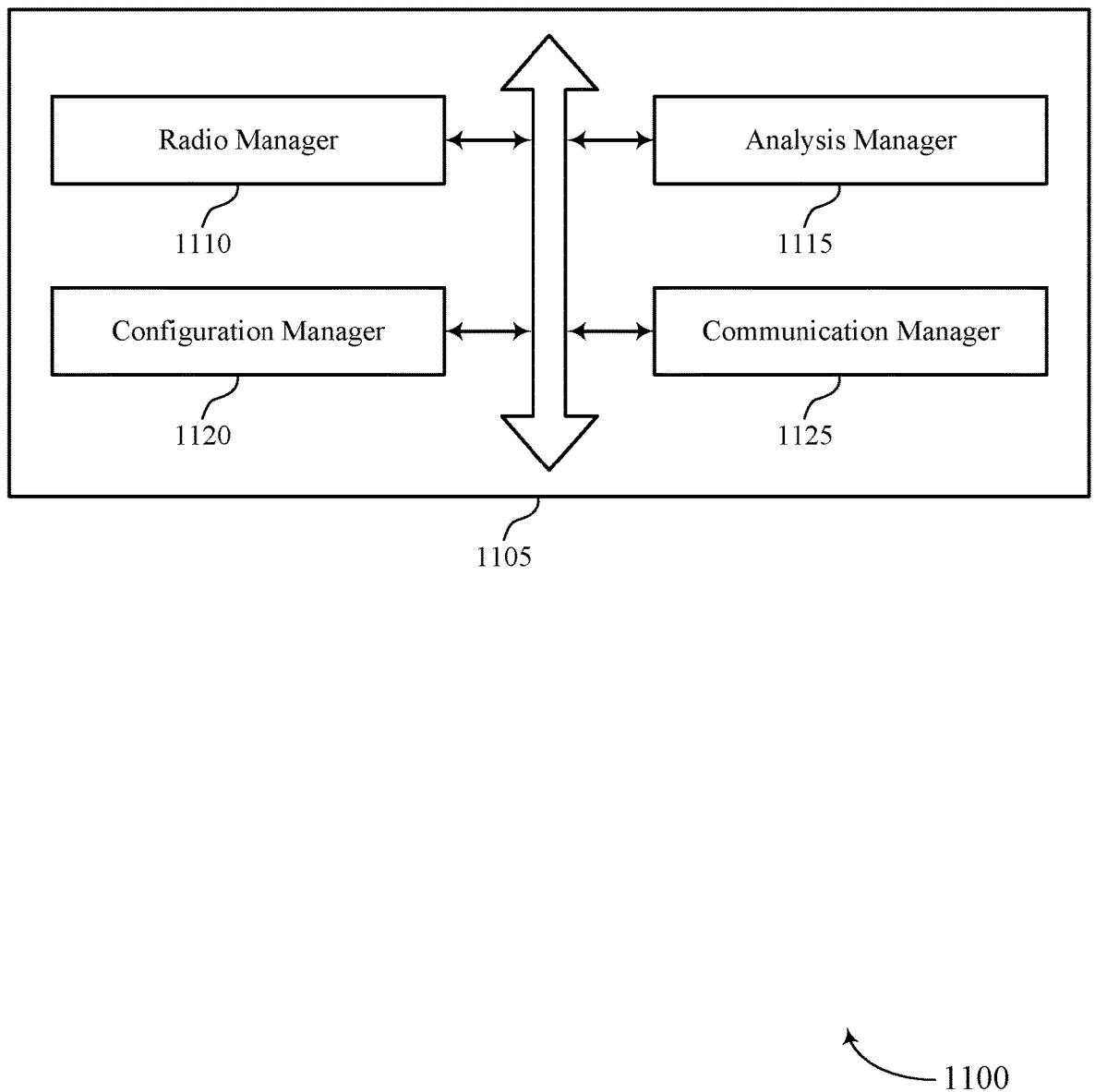
FIG. 11 shows a block diagram of a base station narrowband manager that supports system information block delivery for narrowband communications in accordance with aspects of the present disclosure.

FIG. 11 shows a block diagram 1100 of a base station narrowband manager 1105 that supports system information block delivery for narrowband communications in accordance with aspects of the present disclosure. The base station narrowband manager 1105 may be an example of aspects of a base station narrowband manager 915, a base station narrowband manager 1015, or a base station narrowband manager 1210 described herein. The base station narrowband manager 1105 may include a radio manager 1110, an analysis manager 1115, a configuration manager 1120, and a communication manager 1125. Each of these modules may communicate, directly or indirectly, with one another (e.g., via one or more buses).

The radio manager 1110 may identify, by a base station, a UE operating in narrowband communications. In some examples, the radio manager 1110 may identify, at a base station, a UE operating in narrowband communications. The analysis manager 1115 may determine, by the base station, whether the UE coexists with an additional device operating in wideband communications. In some examples, the analysis manager 1115 may determine, at the base station, whether the UE coexists with an additional device operating in wideband communications.

The configuration manager 1120 may set, by the base station, a message type of a message in a master information block based on the determining. In some examples, the configuration manager 1120 may configure, at the base station based on the determining, a master information block to indicate an additional master information block is to be transmitted to the UE using the narrowband communications. In some examples, the configuration manager 1120 may set the message type of a message in the master information block upon determining the UE does not coexist with another device operating in the wideband communications.

In some examples, the configuration manager 1120 may include configuration for narrowband communications in the master information block. In some examples, the configuration manager 1120 may set the message type to a value that indicates to the UE to use the configuration to configure a search space for narrowband communications. In some examples, the configuration manager 1120 may set a reserved bit in the master information block to indicate to the UE how to configure a search space for the narrowband communications.

In some examples, the configuration manager 1120 may set the reserved bit to a first value to indicate using a common search space control resource set and common search space monitoring occasion to configure the search space of the narrowband communications. In one example, "common" may refer to the common search space control resource set and common search space monitoring occasion being in a master information block in the physical broadcast channel used for wideband communications (e.g., for configuring a wideband user equipment). In some examples, the configuration manager 1120 may set the reserved bit to a second value to indicate using a narrowband control resource set to configure the search space of the narrowband communications.

The communication manager 1125 may transmit, by the base station, the master information block in a physical broadcast channel via the narrowband communications to the UE. In some examples, the communication manager 1125 may transmit, at the base station, the master information block in a physical broadcast channel via the narrowband communications to the UE. In some examples, the communication manager 1125 may transmit the additional master information block to the UE after determining the UE coexists with the additional device operating in wideband communications.

Figure 12:
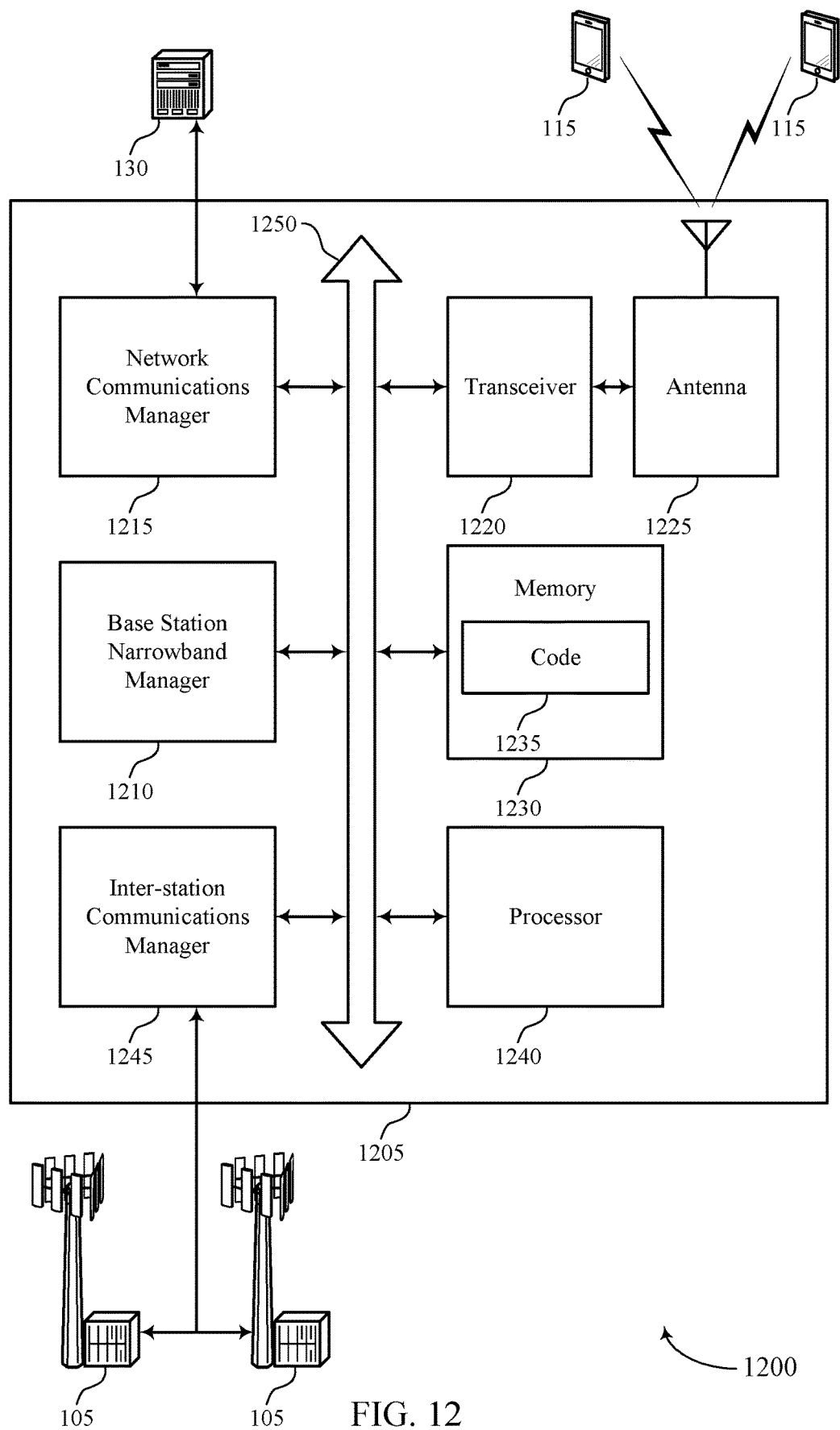
FIG. 12 shows a diagram of a system including a device that supports system information block delivery for narrowband communications in accordance with aspects of the present disclosure.

FIG. 12 shows a diagram of a system 1200 including a device 1205 that supports system information block delivery for narrowband communications in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a base station narrowband manager 1210, a network communications manager 1215, a transceiver 1220, an antenna 1225, memory 1230, a processor 1240, and an inter-station communications manager 1245. These components may be in electronic communication via one or more buses (e.g., bus 1250).

The base station narrowband manager 1210 may identify, by a base station, a UE operating in narrowband communications, determine, by the base station, whether the UE coexists with an additional device operating in wideband communications, set, by the base station, a message type of a message in a master information block based on the determining, and transmit, by the base station, the master information block in a physical broadcast channel via the narrowband communications to the UE. The base station narrowband manager 1210 may also identify, at a base station, a UE operating in narrowband communications, determine, at the base station, whether the UE coexists with an additional device operating in wideband communications, configure, at the base station based on the determining, a master information block to indicate an additional master information block is to be transmitted to the UE using the narrowband communications, and transmit, at the base station, the master information block in a physical broadcast channel via the narrowband communications to the UE.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device #{device} to perform various functions (e.g., functions or tasks supporting system information block delivery for narrowband communications).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
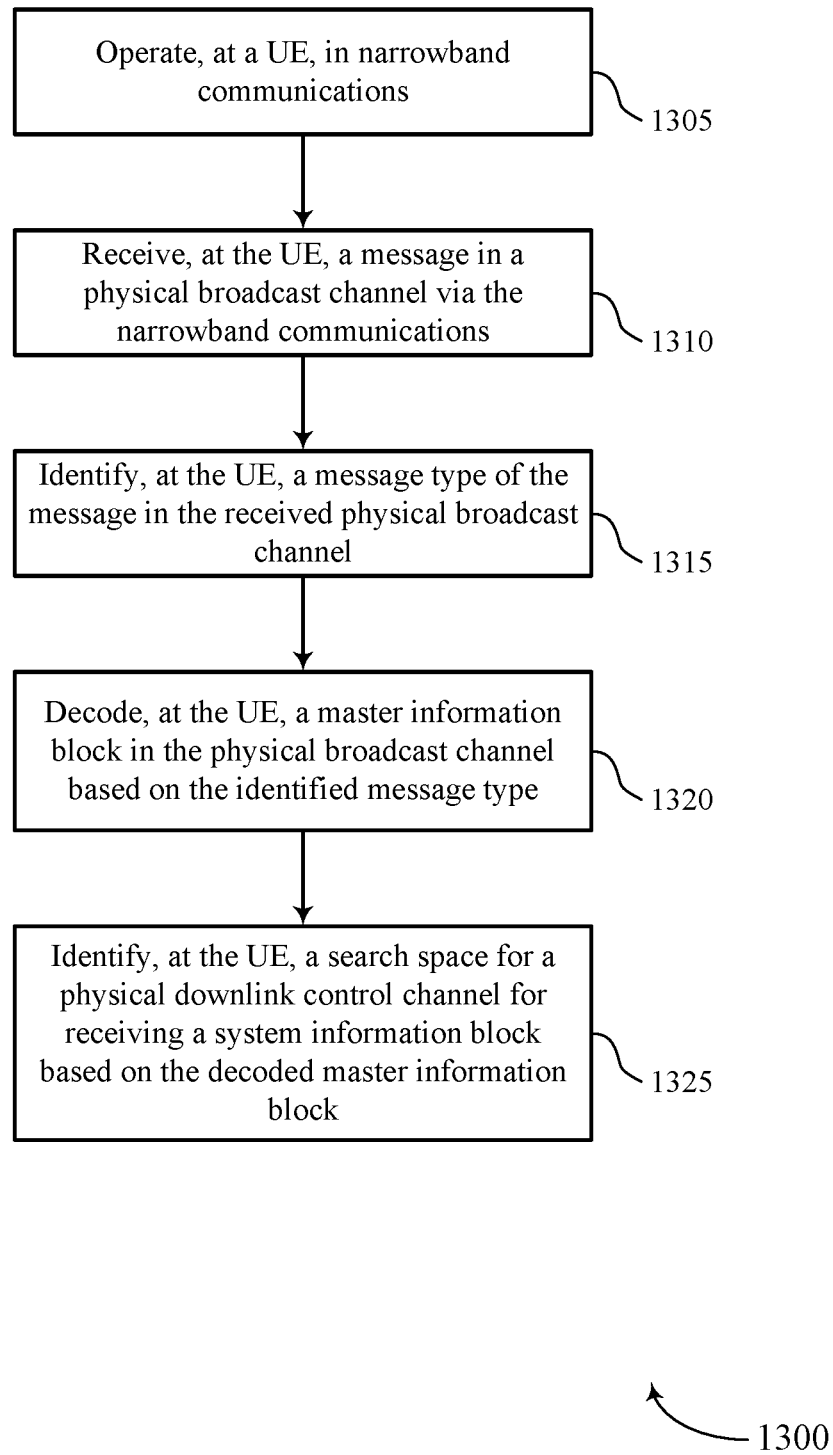
FIGS. 13 through 18 show flowcharts illustrating methods that support system information block delivery for narrowband communications in accordance with aspects of the present disclosure.

FIG. 13 shows a flowchart illustrating a method 1300 that supports system information block delivery for narrowband communications in accordance with aspects of the present disclosure. The operations of method 1300 may be implemented by a UE 115 or its components as described herein. For example, the operations of method 1300 may be performed by a base station narrowband manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may operate, at a UE, in narrowband communications. The operations of 1305 may be performed according to the methods described herein. In some examples, aspects of the operations of 1305 may be performed by a radio manager as described with reference to FIGS. 5 through 8.

At 1310, the UE may receive, at the UE, a message in a physical broadcast channel via the narrowband communications. The operations of 1310 may be performed according to the methods described herein. In some examples, aspects of the operations of 1310 may be performed by a communication manager as described with reference to FIGS. 5 through 8.

At 1315, the UE may identify, at the UE, a message type of the message in the received physical broadcast channel. The operations of 1315 may be performed according to the methods described herein. In some examples, aspects of the operations of 1315 may be performed by a configuration manager as described with reference to FIGS. 5 through 8.

At 1320, the UE may decode, at the UE, a master information block in the physical broadcast channel based on the identified message type. The operations of 1320 may be performed according to the methods described herein. In some examples, aspects of the operations of 1320 may be performed by a decoding manager as described with reference to FIGS. 5 through 8.

At 1325, the UE may identify, at the UE, a search space for a physical downlink control channel for receiving a system information block based on the decoded master information block. The operations of 1325 may be performed according to the methods described herein. In some examples, aspects of the operations of 1325 may be performed by a configuration manager as described with reference to FIGS. 5 through 8.

Figure 14:
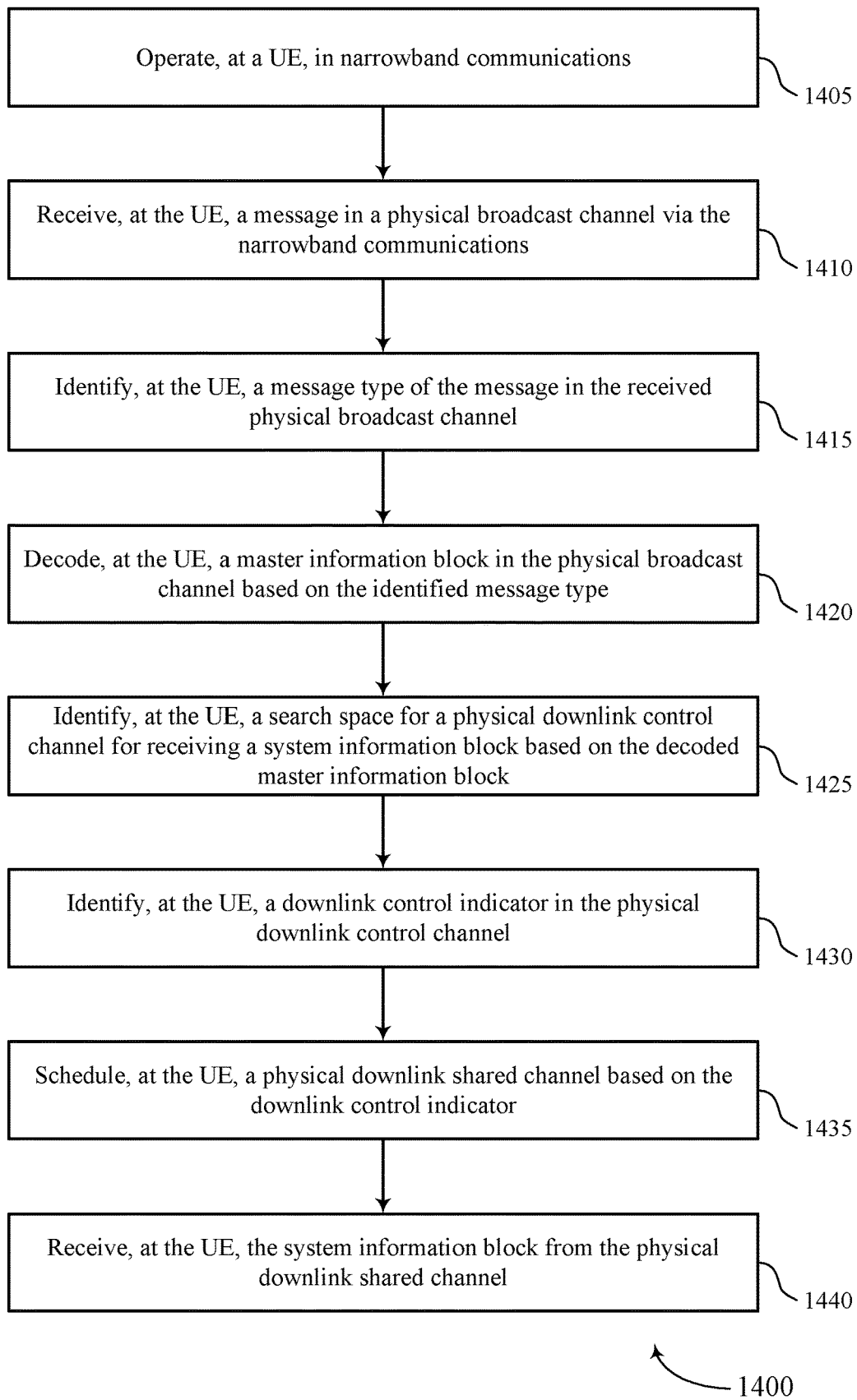

FIG. 14 shows a flowchart illustrating a method 1400 that supports system information block delivery for narrowband communications in accordance with aspects of the present disclosure. The operations of method 1400 may be implemented by a UE 115 or its components as described herein. For example, the operations of method 1400 may be performed by a base station narrowband manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may operate, at a UE, in narrowband communications. The operations of 1405 may be performed according to the methods described herein. In some examples, aspects of the operations of 1405 may be performed by a radio manager as described with reference to FIGS. 5 through 8.

At 1410, the UE may receive, at the UE, a message in a physical broadcast channel via the narrowband communications. The operations of 1410 may be performed according to the methods described herein. In some examples, aspects of the operations of 1410 may be performed by a communication manager as described with reference to FIGS. 5 through 8.

At 1415, the UE may identify, at the UE, a message type of the message in the received physical broadcast channel. The operations of 1415 may be performed according to the methods described herein. In some examples, aspects of the operations of 1415 may be performed by a configuration manager as described with reference to FIGS. 5 through 8.

At 1420, the UE may decode, at the UE, a master information block in the physical broadcast channel based on the identified message type. The operations of 1420 may be performed according to the methods described herein. In some examples, aspects of the operations of 1420 may be performed by a decoding manager as described with reference to FIGS. 5 through 8.

At 1425, the UE may identify, at the UE, a search space for a physical downlink control channel for receiving a system information block based on the decoded master information block. The operations of 1425 may be performed according to the methods described herein. In some examples, aspects of the operations of 1425 may be performed by a configuration manager as described with reference to FIGS. 5 through 8.

At 1430, the UE may identify a downlink control information in the physical downlink control channel. The operations of 1430 may be performed according to the methods described herein. In some examples, aspects of the operations of 1430 may be performed by a configuration manager as described with reference to FIGS. 5 through 8.

At 1435, the UE may schedule a physical downlink shared channel based on the downlink control information. The operations of 1435 may be performed according to the methods described herein. In some examples, aspects of the operations of 1435 may be performed by a configuration manager as described with reference to FIGS. 5 through 8.

At 1440, the UE may receive the system information block from the physical downlink shared channel. The operations of 1440 may be performed according to the methods described herein. In some examples, aspects of the operations of 1440 may be performed by a communication manager as described with reference to FIGS. 5 through 8.

Figure 15:
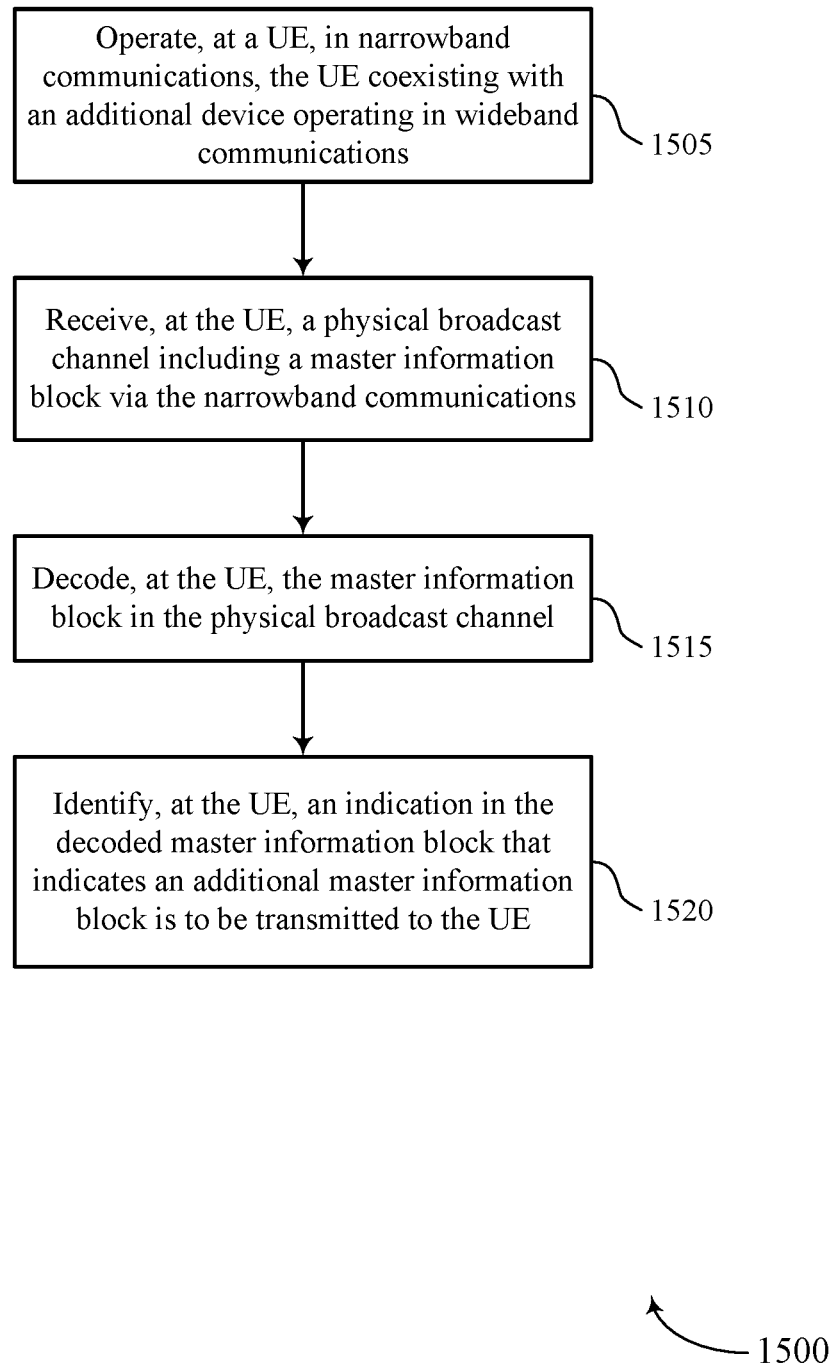

FIG. 15 shows a flowchart illustrating a method 1500 that supports system information block delivery for narrowband communications in accordance with aspects of the present disclosure. The operations of method 1500 may be implemented by a UE 115 or its components as described herein. For example, the operations of method 1500 may be performed by a base station narrowband manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may operate, at a UE, in narrowband communications, the UE coexisting with an additional device operating in wideband communications. The operations of 1505 may be performed according to the methods described herein. In some examples, aspects of the operations of 1505 may be performed by a radio manager as described with reference to FIGS. 5 through 8.

At 1510, the UE may receive, at the UE, a physical broadcast channel including a master information block via the narrowband communications. The operations of 1510 may be performed according to the methods described herein. In some examples, aspects of the operations of 1510 may be performed by a communication manager as described with reference to FIGS. 5 through 8.

At 1515, the UE may decode, at the UE, the master information block in the physical broadcast channel. The operations of 1515 may be performed according to the methods described herein. In some examples, aspects of the operations of 1515 may be performed by a decoding manager as described with reference to FIGS. 5 through 8.

At 1520, the UE may identify, at the UE, an indication in the decoded master information block that indicates an additional master information block is to be transmitted to the UE. The operations of 1520 may be performed according to the methods described herein. In some examples, aspects of the operations of 1520 may be performed by a configuration manager as described with reference to FIGS. 5 through 8.

Figure 16:
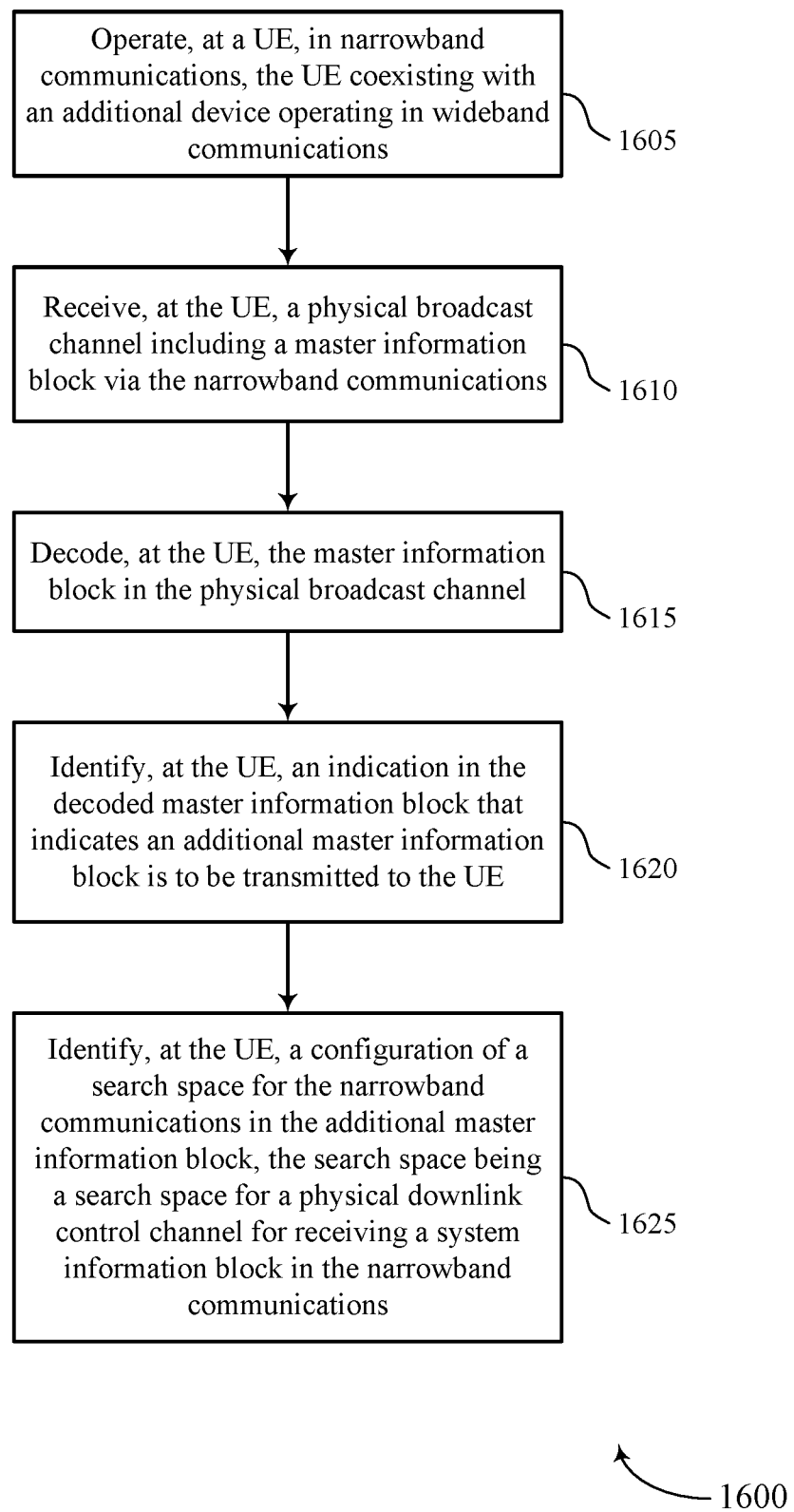

FIG. 16 shows a flowchart illustrating a method 1600 that supports system information block delivery for narrowband communications in accordance with aspects of the present disclosure. The operations of method 1600 may be implemented by a UE 115 or its components as described herein. For example, the operations of method 1600 may be performed by a base station narrowband manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1605, the UE may operate, at a UE, in narrowband communications, the UE coexisting with an additional device operating in wideband communications. The operations of 1605 may be performed according to the methods described herein. In some examples, aspects of the operations of 1605 may be performed by a radio manager as described with reference to FIGS. 5 through 8.

At 1610, the UE may receive, at the UE, a physical broadcast channel including a master information block via the narrowband communications. The operations of 1610 may be performed according to the methods described herein. In some examples, aspects of the operations of 1610 may be performed by a communication manager as described with reference to FIGS. 5 through 8.

At 1615, the UE may decode, at the UE, the master information block in the physical broadcast channel. The operations of 1615 may be performed according to the methods described herein. In some examples, aspects of the operations of 1615 may be performed by a decoding manager as described with reference to FIGS. 5 through 8.

At 1620, the UE may identify, at the UE, an indication in the decoded master information block that indicates an additional master information block is to be transmitted to the UE. The operations of 1620 may be performed according to the methods described herein. In some examples, aspects of the operations of 1620 may be performed by a configuration manager as described with reference to FIGS. 5 through 8.

At 1625, the UE may identify a configuration of a search space for the narrowband communications in the additional master information block, the search space being a search space for a physical downlink control channel for receiving a system information block in the narrowband communications. The operations of 1625 may be performed according to the methods described herein. In some examples, aspects of the operations of 1625 may be performed by a configuration manager as described with reference to FIGS. 5 through 8.

Figure 17:
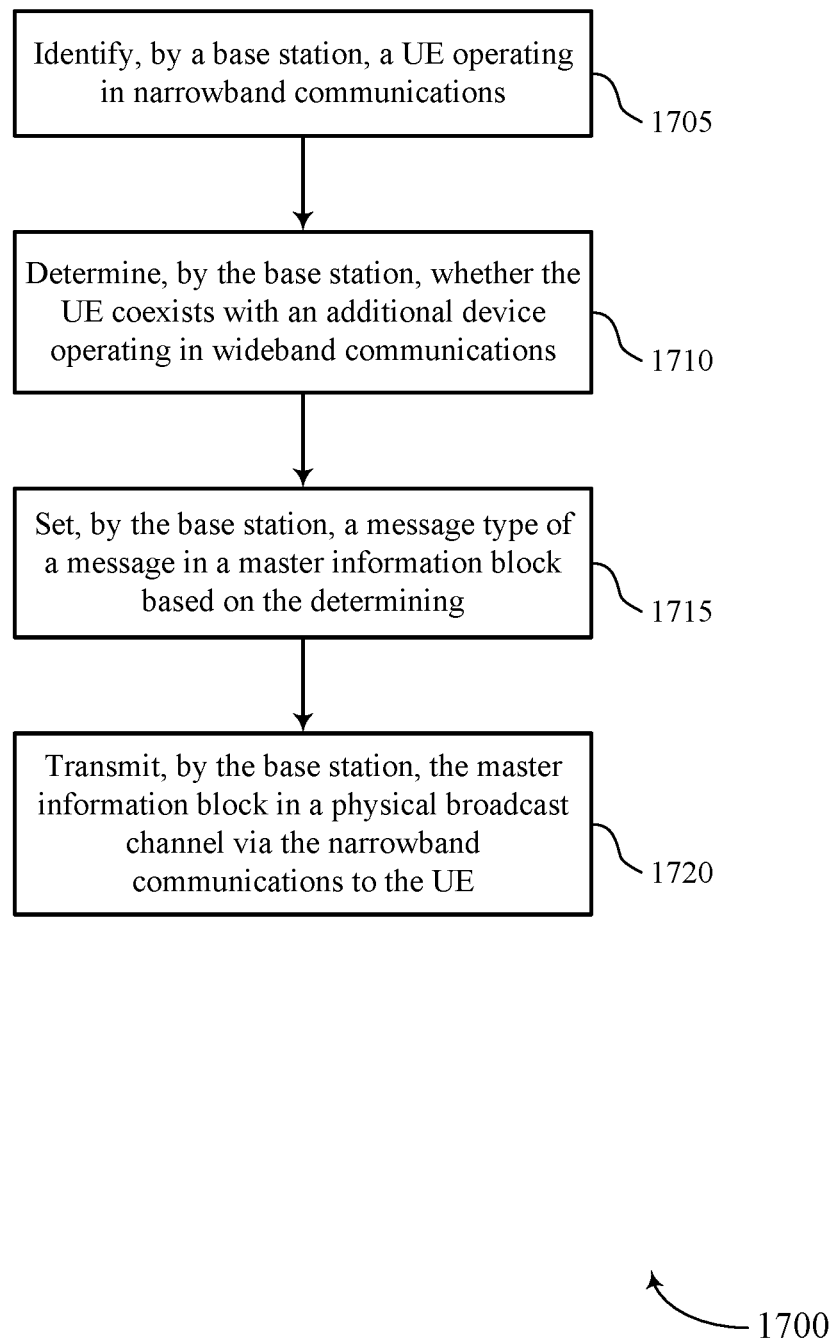

FIG. 17 shows a flowchart illustrating a method 1700 that supports system information block delivery for narrowband communications in accordance with aspects of the present disclosure. The operations of method 1700 may be implemented by a base station 105 or its components as described herein. For example, the operations of method 1700 may be performed by a base station narrowband manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may identify, by a base station, a UE operating in narrowband communications. The operations of 1705 may be performed according to the methods described herein. In some examples, aspects of the operations of 1705 may be performed by a radio manager as described with reference to FIGS. 9 through 12.

At 1710, the base station may determine, by the base station, whether the UE coexists with an additional device operating in wideband communications. The operations of 1710 may be performed according to the methods described herein. In some examples, aspects of the operations of 1710 may be performed by an analysis manager as described with reference to FIGS. 9 through 12.

At 1715, the base station may set, by the base station, a message type of a message in a master information block based on the determining. The operations of 1715 may be performed according to the methods described herein. In some examples, aspects of the operations of 1715 may be performed by a configuration manager as described with reference to FIGS. 9 through 12.

At 1720, the base station may transmit, by the base station, the master information block in a physical broadcast channel via the narrowband communications to the UE. The operations of 1720 may be performed according to the methods described herein. In some examples, aspects of the operations of 1720 may be performed by a communication manager as described with reference to FIGS. 9 through 12.

Figure 18:
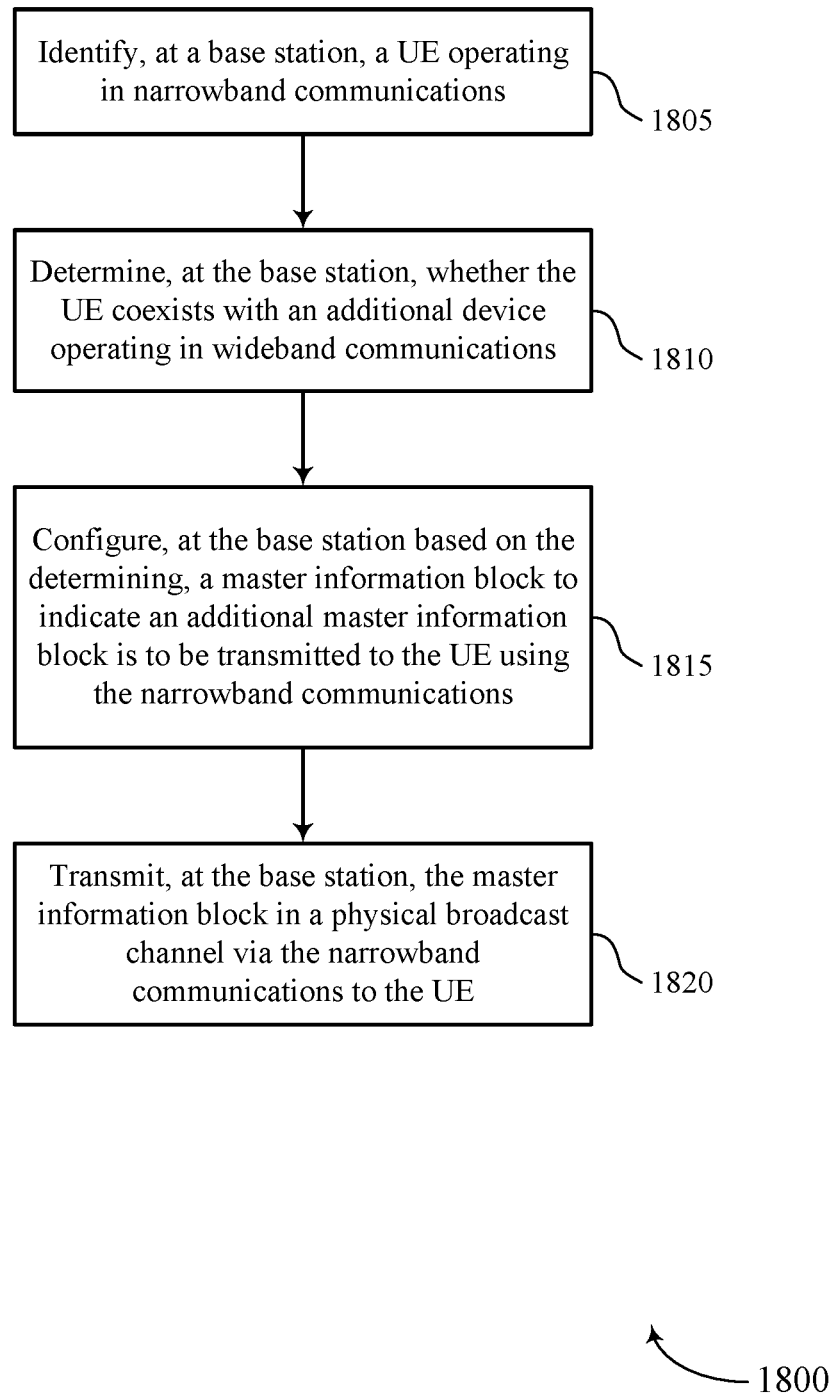

FIG. 18 shows a flowchart illustrating a method 1800 that supports system information block delivery for narrowband communications in accordance with aspects of the present disclosure. The operations of method 1800 may be implemented by a base station 105 or its components as described herein. For example, the operations of method 1800 may be performed by a base station narrowband manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1805, the base station may identify, at a base station, a UE operating in narrowband communications. The operations of 1805 may be performed according to the methods described herein. In some examples, aspects of the operations of 1805 may be performed by a radio manager as described with reference to FIGS. 9 through 12.

At 1810, the base station may determine, at the base station, whether the UE coexists with an additional device operating in wideband communications. The operations of 1810 may be performed according to the methods described herein. In some examples, aspects of the operations of 1810 may be performed by an analysis manager as described with reference to FIGS. 9 through 12.

At 1815, the base station may configure, at the base station based on the determining, a master information block to indicate an additional master information block is to be transmitted to the UE using the narrowband communications. The operations of 1815 may be performed according to the methods described herein. In some examples, aspects of the operations of 1815 may be performed by a configuration manager as described with reference to FIGS. 9 through 12.

At 1820, the base station may transmit, at the base station, the master information block in a physical broadcast channel via the narrowband communications to the UE. The operations of 1820 may be performed according to the methods described herein. In some examples, aspects of the operations of 1820 may be performed by a communication manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
operating, at a user equipment (UE), in narrowband communications;
receiving, at the UE, a message in a physical broadcast channel via the narrowband communications;
identifying, at the UE, a message type of the message in the received physical broadcast channel, wherein the message type comprises one of a narrowband master information block or a wideband master information block, and wherein identifying the message type comprises determining whether a binary value of the message indicates the physical broadcast channel carries the narrowband master information block or the wideband master information block;
decoding, at the UE, a master information block in the physical broadcast channel based at least in part on the identified message type; and
identifying, at the UE, a search space for a physical downlink control channel for receiving a system information block based at least in part on the decoded master information block.

2. The method of claim 1, further comprising:
identifying a downlink control information in the physical downlink control channel.

3. The method of claim 2, further comprising:
scheduling a physical downlink shared channel based at least in part on the downlink control information.

4. The method of claim 3, further comprising:
receiving the system information block from the physical downlink shared channel.

5. The method of claim 1, wherein the UE comprises an internet of things (IoT) device, or a wearable device, or an industrial sensor, or video monitoring equipment, or any combination thereof.

6. The method of claim 1, wherein the search space includes a search space configured for the narrowband communications.

7. The method of claim 1, wherein identifying, at the UE, the search space for the physical downlink control channel for receiving the system information block based at least in part on the decoded master information block, comprises:
identifying a binary value of a reserved bit in the master information block that indicates a configuration of the search space.

8. The method of claim 7, wherein the binary value of the reserved bit indicates one of: the UE to use a common search space control resource set and common search space monitoring occasion to configure the search space of the narrowband communications, or the UE is barred from accessing a cell.

9. The method of claim 1, wherein a first binary value indicates the master information block in the physical broadcast channel is configured for narrowband communications and a second binary value indicates the master information block in the physical broadcast channel is configured for wideband communications.

10. A method for wireless communication, comprising:
identifying, by a base station, a user equipment (UE) operating in narrowband communications;
determining, by the base station, whether the UE coexists with an additional device operating in wideband communications;
setting, by the base station, a message type of a message in a master information block based at least in part on the determining, wherein the message type comprises one of a narrowband master information block or a wideband master information block, and wherein setting the message type comprises determining whether a binary value of the message indicates a physical broadcast channel carries the narrowband master information block or the wideband master information block; and
transmitting, by the base station, the master information block in the physical broadcast channel via the narrowband communications to the UE.

11. The method of claim 10, further comprising:
setting the message type of a message in the master information block upon determining the UE does not coexist with another device operating in the wideband communications.

12. The method of claim 10, further comprising:
including configuration for narrowband communications in the master information block.

13. The method of claim 12, further comprising:
setting the message type to a value that indicates to the UE to use the configuration to configure a search space for narrowband communications.

14. The method of claim 13, wherein a binary value of a reserved bit in the master information block indicates a configuration of the search space.

15. An apparatus for wireless communication, comprising:
a processor;
memory coupled with the processor; and
instructions stored in the memory and operable, when executed by the processor, to cause the apparatus to:
operate, at a user equipment (UE), in narrowband communications;
receive, at the UE, a message in a physical broadcast channel via the narrowband communications;
identify, at the UE, a message type of the message in the received physical broadcast channel, wherein the message type comprises one of a narrowband master information block or a wideband master information block, and wherein identifying the message type comprises determining whether a binary value of the message indicates the physical broadcast channel carries the narrowband master information block or the wideband master information block;
decode, at the UE, a master information block in the physical broadcast channel based at least in part on the identified message type; and
identify, at the UE, a search space for a physical downlink control channel for receiving a system information block based at least in part on the decoded master information block.

16. The apparatus of claim 15, wherein the instructions are further executable by the processor to:
identify a downlink control information in the physical downlink control channel.

17. The apparatus of claim 16, wherein the instructions are further executable by the processor to:
schedule a physical downlink shared channel based at least in part on the downlink control information.

18. The apparatus of claim 17, wherein the instructions are further executable by the processor to:
receive the system information block from the physical downlink shared channel.

19. The apparatus of claim 15, wherein the UE comprises an internet of things (IoT) device, or a wearable device, or an industrial sensor, or video monitoring equipment, or any combination thereof.

20. The apparatus of claim 15, wherein the search space includes a search space configured for the narrowband communications.

21. The apparatus of claim 15, wherein identifying, at the UE, the search space for the physical downlink control channel for receiving the system information block based at least in part on the decoded master information block, comprises:
identifying a binary value of a reserved bit in the master information block that indicates a configuration of the search space.

22. The apparatus of claim 21, wherein the binary value of the reserved bit indicates one of: the UE to use a common search space control resource set and common search space monitoring occasion to configure the search space of the narrowband communications; or the UE is barred from accessing a cell.

23. A non-transitory computer readable medium storing code for wireless communication, the code comprising instructions executable by a processor to:
operate, at a user equipment (UE), in narrowband communications;
receive, at the UE, a message in a physical broadcast channel via the narrowband communications;
identify, at the UE, a message type of the message in the received physical broadcast channel, wherein the message type comprises one of a narrowband master information block or a wideband master information block, and wherein identifying the message type comprises determining whether a binary value of the message indicates the physical broadcast channel carries the narrowband master information block or the wideband master information block;
decode, at the UE, a master information block in the physical broadcast channel based at least in part on the identified message type; and
identify, at the UE, a search space for a physical downlink control channel for receiving a system information block based at least in part on the decoded master information block.

24. The non-transitory computer readable medium of claim 23, wherein the instructions are further executable by the processor to:
identify a downlink control information in the physical downlink control channel.

25. The non-transitory computer readable medium of claim 24, wherein the instructions are further executable by the processor to:
schedule a physical downlink shared channel based at least in part on the downlink control information.

26. The non-transitory computer readable medium of claim 25, wherein the instructions are further executable by the processor to:
receive the system information block from the physical downlink shared channel.

27. The non-transitory computer readable medium of claim 23, wherein the UE comprises an internet of things (IoT) device, or a wearable device, or an industrial sensor, or video monitoring equipment, or any combination thereof.

28. The non-transitory computer readable medium of claim 23, wherein the search space includes a search space configured for the narrowband communications.

29. The non-transitory computer readable medium of claim 23, wherein identifying, at the UE, the search space for the physical downlink control channel for receiving the system information block based at least in part on the decoded master information block, comprises:
identifying a binary value of a reserved bit in the master information block that indicates a configuration of the search space.

30. The non-transitory computer readable medium of claim 29, wherein the binary value of the reserved bit indicates one of: the UE to use a common search space control resource set and common search space monitoring occasion to configure the search space of the narrowband communications; or the UE is barred from accessing a cell.

* * * * *